(12) United States Patent
Shuto

(10) Patent No.: US 12,180,025 B2
(45) Date of Patent: Dec. 31, 2024

(54) IMAGE READING APPARATUS

(71) Applicant: SEIKO EPSON CORPORATION, Tokyo (JP)

(72) Inventor: Ryoichi Shuto, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 266 days.

(21) Appl. No.: 17/936,580

(22) Filed: Sep. 29, 2022

(65) Prior Publication Data

US 2023/0095138 A1    Mar. 30, 2023

(30) Foreign Application Priority Data

Sep. 30, 2021   (JP) .................................. 2021-160603

(51) Int. Cl.
*B65H 3/52*   (2006.01)
*B65H 3/06*   (2006.01)
*H04N 1/00*   (2006.01)

(52) U.S. Cl.
CPC ............. *B65H 3/5261* (2013.01); *B65H 3/06* (2013.01); *B65H 3/0638* (2013.01); *B65H 3/0669* (2013.01); *B65H 3/52* (2013.01); *H04N 1/00602* (2013.01); *H04N 1/00628* (2013.01); *H04N 1/00649* (2013.01); *B65H 2402/44* (2013.01); *B65H 2402/441* (2013.01); *B65H 2403/40* (2013.01); *B65H 2511/414* (2013.01); *B65H 2801/39* (2013.01)

(58) Field of Classification Search
CPC ................ B65H 3/0669; B65H 3/0638; B65H 2403/40; B65H 3/0661; B65H 3/5261; B65H 3/5284; B65H 2402/31; B65H 2402/441; B65H 2404/144; B65H 2404/1441; B65H 2404/1442; B65H 2404/7414; H04N 1/00602; H04N 1/00628
See application file for complete search history.

(56) References Cited

U.S. PATENT DOCUMENTS 10,764,462 B2 *   9/2020   Miyauchi ............... B65H 1/266

FOREIGN PATENT DOCUMENTS

JP            2019-099298 A      6/2019

* cited by examiner

*Primary Examiner* — Jeremy R Severson
(74) *Attorney, Agent, or Firm* — WORKMAN NYDEGGER

(57) ABSTRACT

An apparatus main body of an image reading apparatus is capable of being switched between a first posture and a second posture in which an inclination angle is smaller than that of the first posture. The image reading apparatus is capable of switching between a separation state in which a separation roller separates a document and a non-separation state in which the separation roller does not separate the document. The image reading apparatus puts the separation roller in the separation state when the apparatus main body is in the first posture and puts the separation roller in the non-separation state when the apparatus main body is in the second posture.

10 Claims, 25 Drawing Sheets

IMAGE READING APPARATUS

The present application is based on, and claims priority from JP Application Serial Number 2021-160603, filed Sep. 30, 2021, the disclosure of which is hereby incorporated by reference herein in its entirety.

BACKGROUND

1. Technical Field

The present disclosure relates to an image reading apparatus that reads an image on a medium.

2. Related Art

There is a sheet feed type scanner as an example of an image reading apparatus, and in such an image reading apparatus, a configuration in which a medium is nipped and separated by a separation roller and a feeding roller may be adopted. There is a document having a booklet shape in addition to a document having a sheet shape, and since there is a possibility of damage when a separation action is applied to the document having a booklet shape, there is an apparatus that is capable of switching between separation feeding for obtaining a separation function and non-separation feeding for stopping the separation function as in an image reading apparatus described in JP-A-2019-099298.

In the image reading apparatus described in JP-A-2019-099298, the separation function and the non-separation function are switched according to an instruction from an operator. However, in a configuration in which a posture of an apparatus main body is capable of being switched between a posture suitable for a document having a sheet shape and a posture suitable for a document having a booklet shape, it is necessary to switch between a separation function and a non-separation function in addition to the posture switching of the apparatus main body, which increases the user's operation.

SUMMARY

According to an aspect of the present disclosure, there is provided an image reading apparatus for solving the above problems includes: a main body supporting portion placed on a placement surface of an apparatus; and an apparatus main body supported by the main body supporting portion, in which the apparatus main body includes a document supporting portion supporting a document, a feeding roller feeding the document supported by the document supporting portion, a separation roller provided at a position facing the feeding roller, a reading portion reading the document that is fed by the feeding roller, and a read transporting path that is a document transporting path for transporting the document and that faces the reading portion, the apparatus main body is rotatably attached to the main body supporting portion and is configured to be switched between a first posture and a second posture in which an angle formed by the read transporting path with the placement surface is smaller than that of the first posture by rotation of the apparatus main body, the image reading apparatus further includes a separation switching section configured to switch between a separation state in which the separation roller separates the document and a non-separation state in which the separation roller does not separate the document, and the separation switching section puts the separation roller in the separation state when the apparatus main body is in the first posture and puts the separation roller in the non-separation state when the apparatus main body is in the second posture.

DESCRIPTION OF EXEMPLARY EMBODIMENTS

Figure 1:
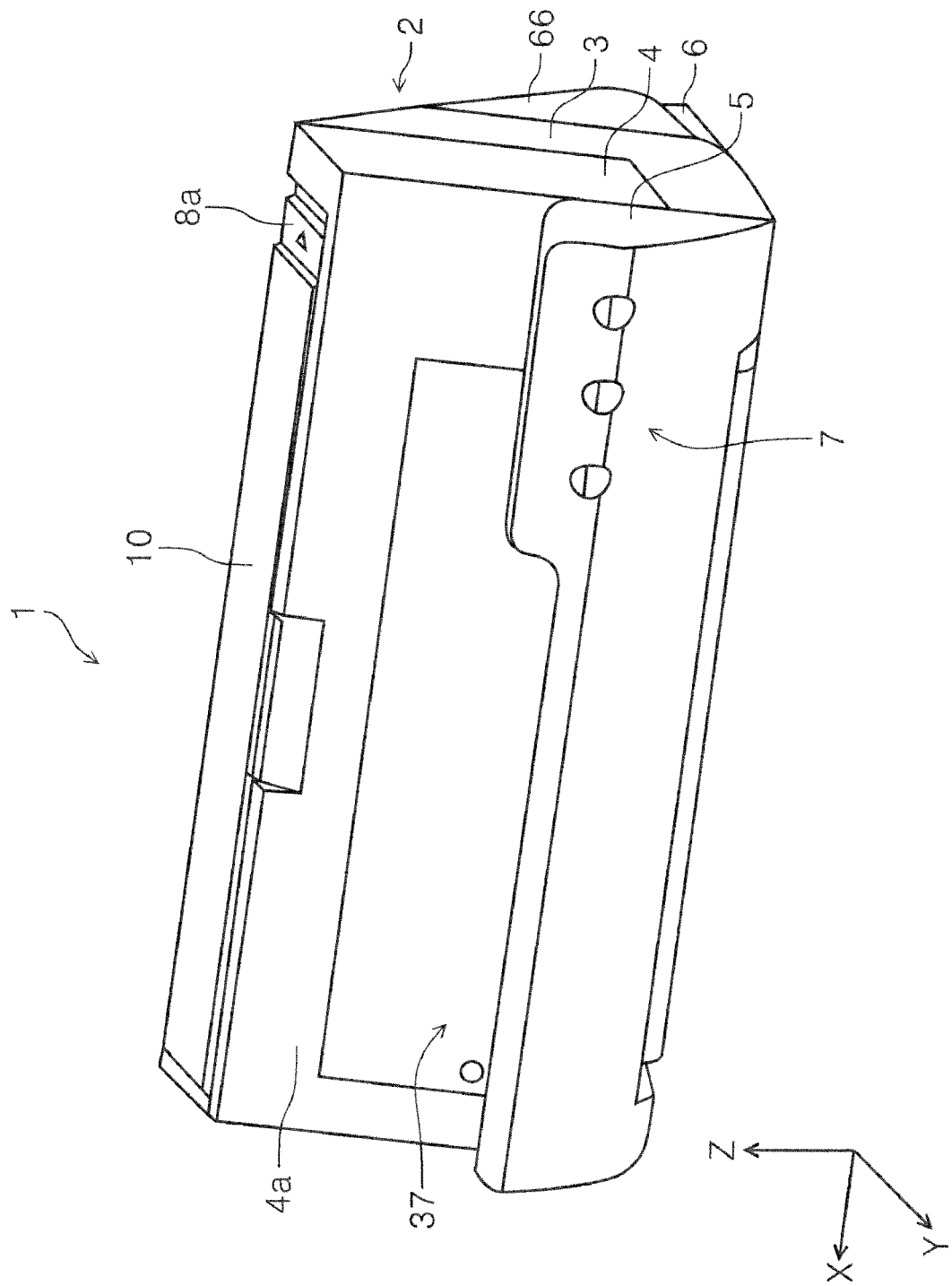
FIG. 1 is a perspective view of a scanner in which an apparatus main body is in a normal reading posture as viewed from the front.

Hereinafter, the present disclosure will be schematically described.

An image reading apparatus according to a first aspect includes: a main body supporting portion placed on a placement surface of an apparatus; and an apparatus main body supported by the main body supporting portion, in which the apparatus main body includes a document supporting portion supporting a document, a feeding roller feeding the document supported by the document supporting portion, a separation roller provided at a position facing the feeding roller, a reading portion reading the document that is fed by the feeding roller, and a read transporting path that is a document transporting path for transporting the document and that faces the reading portion, the apparatus main body is rotatably attached to the main body supporting portion and is configured to be switched between a first posture and a second posture in which an angle formed by the read transporting path with the placement surface is smaller than that of the first posture by rotation of the apparatus main body, the image reading apparatus further includes a separation switching section configured to switch between a separation state in which the separation roller separates the document and a non-separation state in which the separation roller does not separate the document, and the separation switching section puts the separation roller in the separation state when the apparatus main body is in the first posture and puts the separation roller in the non-separation state when the apparatus main body is in the second posture.

According to the present aspect, the separation switching section puts the separation roller in the separation state when the apparatus main body is in the first posture and puts the separation roller in the non-separation state when the apparatus main body is in the second posture, so that a user does not need to perform a dedicated operation for switching between the separation state and the non-separation state of the separation roller, and the usability of the apparatus is improved.

A second aspect according to the first aspect may further include a resistance applying portion applying rotational resistance to the separation roller, in which the separation switching section may regulate rotation of the resistance applying portion and regulate associative rotation of the separation roller and the resistance applying portion to form the separation state, and the separation switching section may allow the rotation of the resistance applying portion and allow the associative rotation of the separation roller and the resistance applying portion to form the non-separation state.

According to the present aspect, the separation state and the non-separation state are switched by switching between the regulation and allowance of the rotation of the resistance applying portion, so that the separation state and the non-separation state can be easily switched.

In a third aspect according to the second aspect, the separation switching section may include a link member that is a member engaged with a cam portion formed at the main body supporting portion and is configured to slide in the apparatus main body, and a pressing member that presses the link member toward the cam portion, the cam portion may have a shape in which the link member slides according to the rotation of the apparatus main body, and when the link member slides according to the rotation of the apparatus main body, the separation state in which the rotation of the resistance applying portion is regulated and the non-separation state in which the rotation of the resistance applying portion is allowed, may be switched.

According to the present aspect, the separation switching section is configured to switch between the regulation and the allowance of the rotation of the resistance applying portion when the link member slides according to the posture switching of the apparatus main body, so that the separation switching section can be implemented with a simple configuration.

In a fourth aspect according to the third aspect, a first toothed wheel may be provided in the resistance applying portion, and the separation switching section may include a first mechanism portion that has the link member, a second mechanism portion that is related to the first toothed wheel, and a connection shaft that is a shaft configured to rotate extending along a rotation shaft line direction of the resistance applying portion and that connects the first mechanism portion and the second mechanism portion.

According to the present aspect, the first mechanism portion and the second mechanism portion are connected by the connection shaft, so that the first mechanism portion and the second mechanism portion can be disposed separated from each other, and the degree of freedom in designing the apparatus is improved.

In a fifth aspect according to the fourth aspect, the second mechanism portion may include a second toothed wheel that meshes with the first toothed wheel, and a third toothed wheel that is a toothed wheel meshing with the second toothed wheel and is provided at one end of the connection shaft, the first mechanism portion may include a fourth toothed wheel that is provided at the other end of the connection shaft, and a rotation regulating member that is a member having a toothed portion configured to mesh with the fourth toothed wheel and in which the toothed portion advances and retreats with respect to the fourth toothed wheel when the rotation regulating member is engaged with the link member and rotates according to the slide of the link member, and when the toothed portion meshes with the fourth toothed wheel, the rotation of the resistance applying portion may be regulated and the separation state may be formed, and when the toothed portion is separated from the fourth toothed wheel, the rotation of the resistance applying portion may be allowed and the non-separation state may be formed.

In a sixth aspect according to the fourth aspect, the second mechanism portion may include a rotation regulating member that is a member having a toothed portion meshing with the first toothed wheel and is configured to advance and retreat with respect to the first toothed wheel, and a rotation cam that is a rotation cam provided at one end of the connection shaft and that switches between a state in which the rotation regulating member is caused to advance toward the first toothed wheel and a state in which the rotation regulating member is caused to retreat from the first toothed wheel by rotation of the rotation cam, and the first mechanism portion may have a configuration in which the connection shaft is rotated when the first mechanism portion rotates according to the slide of the link member.

A seventh aspect according to any one of the first to sixth aspects may further include a frame configuring a substrate of the apparatus main body, in which the frame may have a shape along a direction in which the read transporting path extends, and the separation switching section may be disposed in an area formed at a lower side of the frame.

According to the present aspect, the frame configuring the substrate of the apparatus main body is provided, the frame has a shape along the direction in which the read transporting path extends, and the separation switching section is disposed in the area formed at the lower side of the frame, so that it is possible to suppress the increase in size of the apparatus by disposing the separation switching section using the area formed at the lower side of the frame.

An eighth aspect according to any one of the first to seventh aspects may further include: an inversion transporting path that is a document transporting path downstream from the read transporting path and is used when the read document is inverted upward and ejected; a non-inversion transporting path that is a document transporting path downstream from the read transporting path and is used when the read document is ejected without being inverted; and a transporting path switching section that switches a document transporting path coupled to the read transporting path to either the inversion transporting path or the non-inversion transporting path, in which the transporting path switching section may couple the read transporting path to the inversion transporting path when the apparatus main body takes the first posture and couple the read transporting path to the non-inversion transporting path when the apparatus main body takes the second posture.

According to the present aspect, the image reading apparatus is capable of switching between the inversion transporting path and the non-inversion transporting path, so that it is possible to satisfactorily transport the document that is hard to bend by using the non-inversion transporting path. The apparatus main body is capable of being switched between the first posture and the second posture in which the angle formed by the read transporting path with the placement surface is smaller than that of the first posture by the rotation of the apparatus main body. The transporting path switching section couples the read transporting path to the inversion transporting path when the apparatus main body takes the first posture, and couples the read transporting path to the non-inversion transporting path when the apparatus main body takes the second posture. Thereby, the ejection direction of the document can be set to be along the placement surface, rather than ejecting the document by using the non-inversion transporting path when the first posture is taken. As a result, it is possible to eject the document having a larger size as compared with the embodiment in which the document is ejected by using the non-inversion transporting path when the first posture is taken.

Further, by setting the posture of the apparatus main body in the first posture, the angle that is formed by the read transporting path and the placement surface can be made larger than that of the second posture, and the footprint of the apparatus main body can be suppressed.

Hereinafter, the present disclosure will be specifically described.

In the following, as an example of the image reading apparatus, a scanner 1 will be taken as an example, which is capable of reading at least one side between a first side of a document and a second side that is opposite to the first side. The scanner 1 is a so-called sheet feed type scanner that reads the document while moving the document with respect to a reading portion described later.

In the present specification, the document includes not only a document having a sheet shape but also a document having a card shape or a document having a booklet shape.

In the X-Y-Z coordinate system illustrated in each figure, the X axis direction is an apparatus width direction and also a document width direction. The Y axis direction is an apparatus depth direction, and the Z axis direction is a direction along the vertical direction.

In the present embodiment, the +Y direction is defined as a direction from a back surface toward a front surface of the apparatus, and the −Y direction is defined as a direction from the front surface toward the back surface of the apparatus. When viewed from the front surface of the apparatus, the left direction is defined as the +X direction, and the right direction is defined as the −X direction.

In the following, a direction in which the document is transported may be referred to as "downstream", and a direction opposite thereto may be referred to as "upstream".

Figure 2:
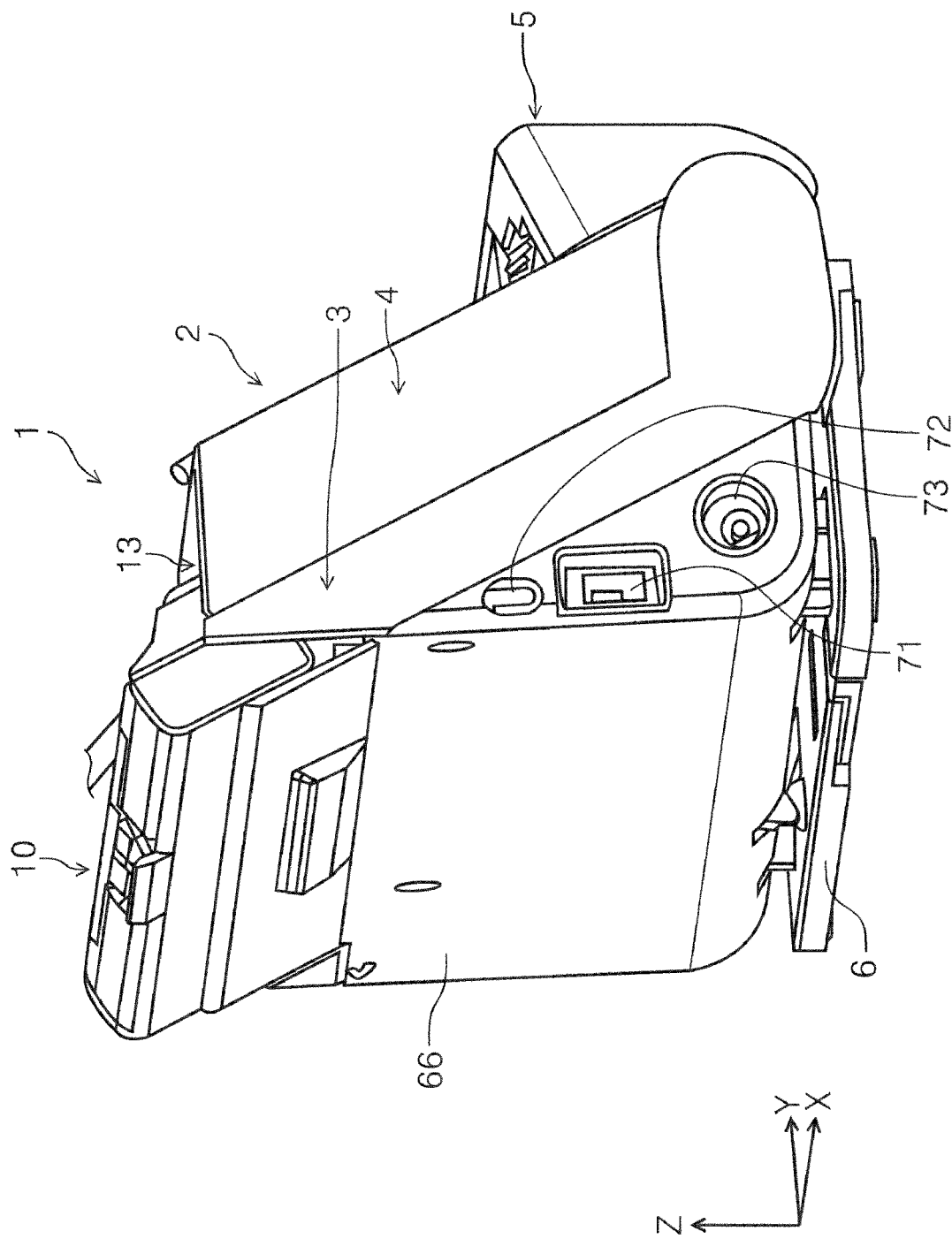
FIG. 2 is a perspective view of the scanner in which the apparatus main body is in the normal reading posture as viewed from the rear.

In FIGS. 1 and 2, the scanner 1 includes the apparatus main body 2 and a main body supporting portion 6 that rotatably supports the apparatus main body 2.

The apparatus main body 2 includes a first unit 3, a second unit 4, and a third unit 5.

Figure 3:
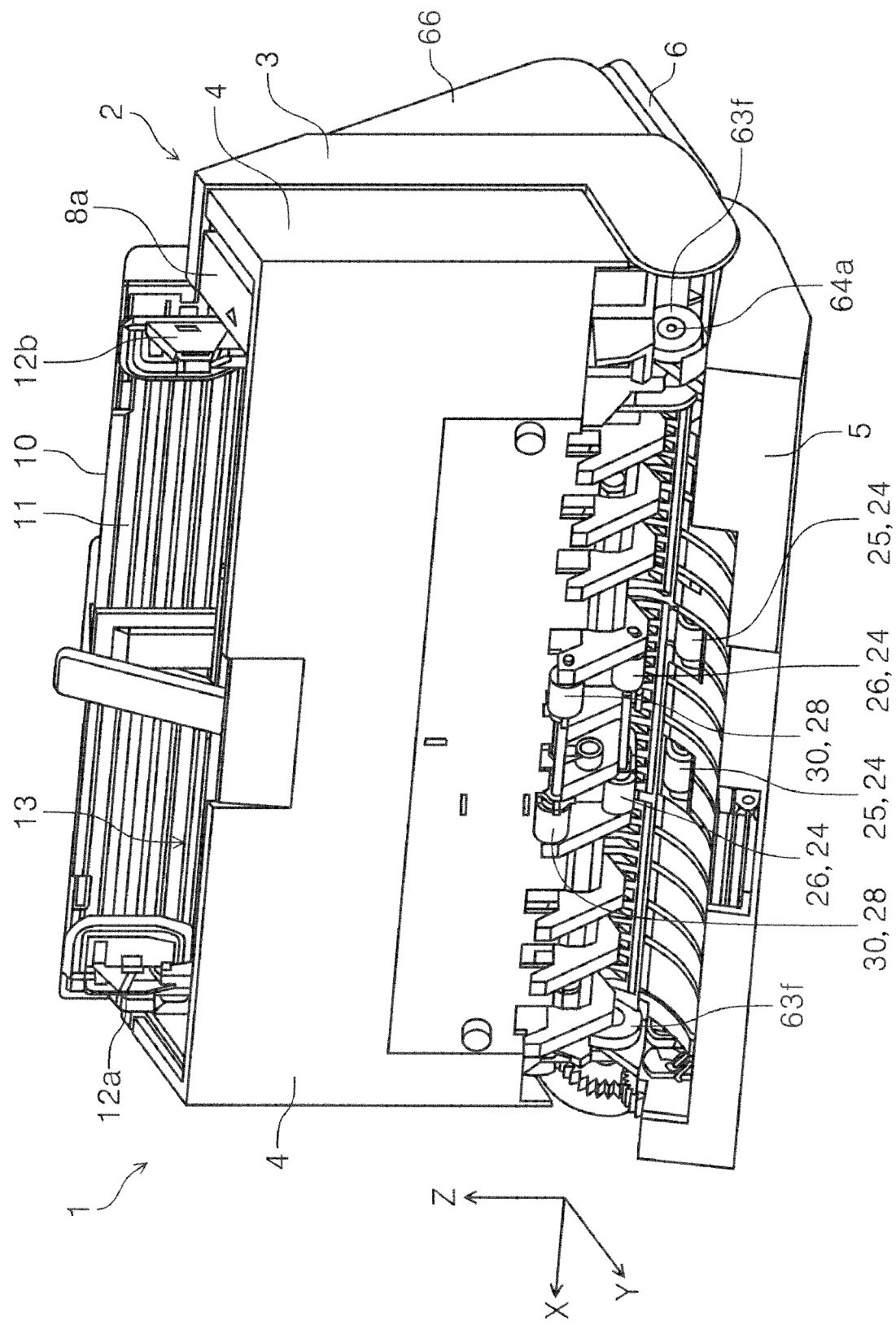
FIG. 3 is a perspective view of the scanner, in which the apparatus main body is in the normal reading posture and a third unit is opened, as viewed from the front.

The second unit 4 and the third unit 5 are provided so as to be capable of rotating around a frame rotation shaft 64a (see FIG. 3). The frame rotation shaft 64a is a rotation shaft forming a center of the rotation shaft that is parallel to the X axis direction.

Figure 4:
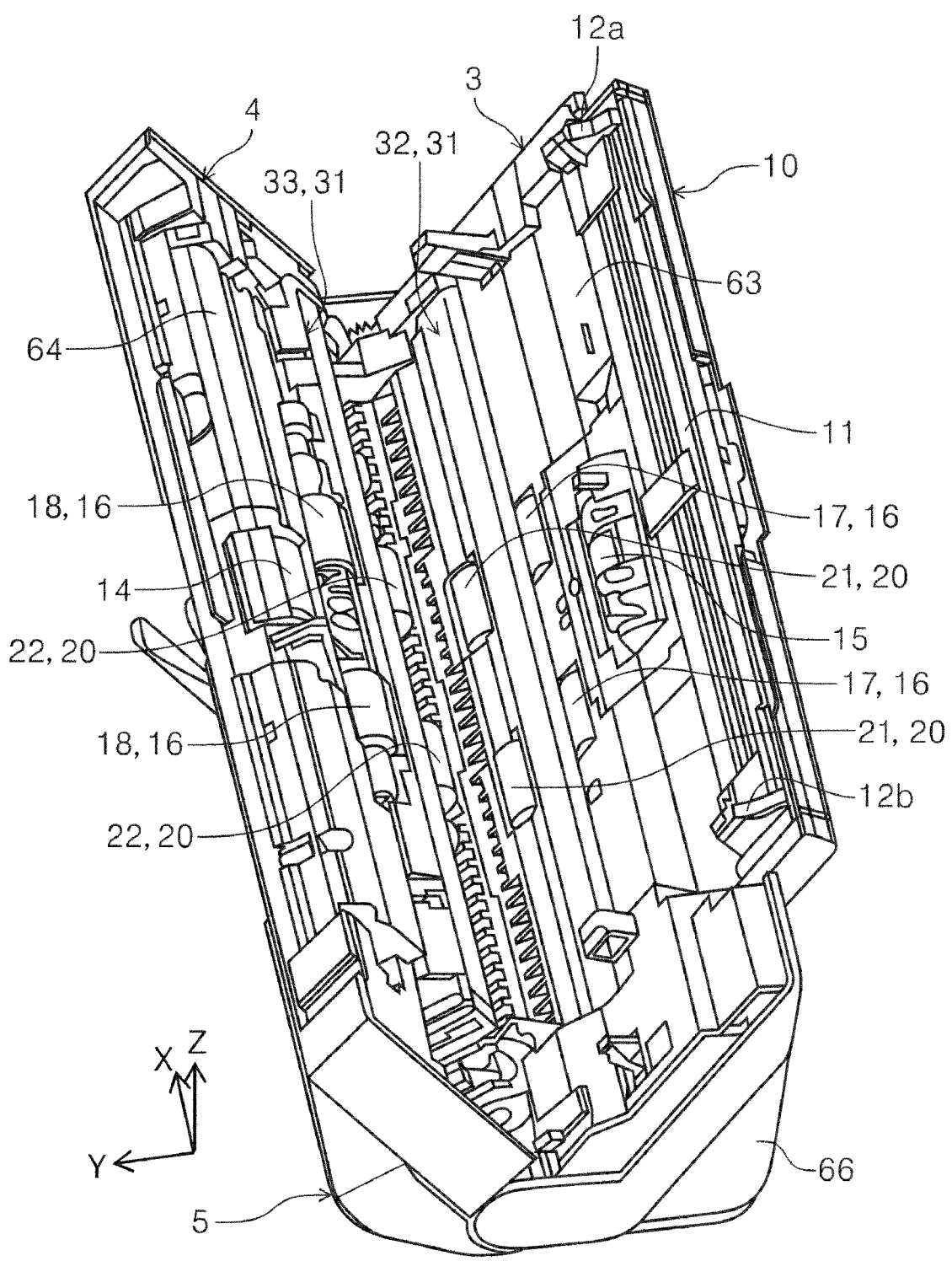
FIG. 4 is a perspective view of the scanner, in which the apparatus main body is in the normal reading posture and a second unit is opened, as viewed from the above.

The second unit 4 and the third unit 5 can integrally rotate around the frame rotation shaft 64a with respect to the first unit 3 (see FIG. 4). By rotating the second unit 4 and the third unit 5 with respect to the first unit 3, a part of a document transporting path can be exposed as illustrated in FIG. 4. Particularly, a document feeding path R1 and a read transporting path R2, which will be described later, can be exposed. A user can unlock the second unit 4 with respect to the first unit 3 and open the second unit 4 by sliding an unlocking portion 8a in the −X direction.

The third unit 5 can rotate around the frame rotation shaft 64a with respect to the first unit 3 and the second unit 4 (see FIG. 3). By rotating the third unit 5 with respect to the first unit 3 and the second unit 4, a part of the document transporting path can be exposed as illustrated in FIG. 3. Particularly, an inversion transporting path R3, which will be described later, can be exposed.

Figure 5:
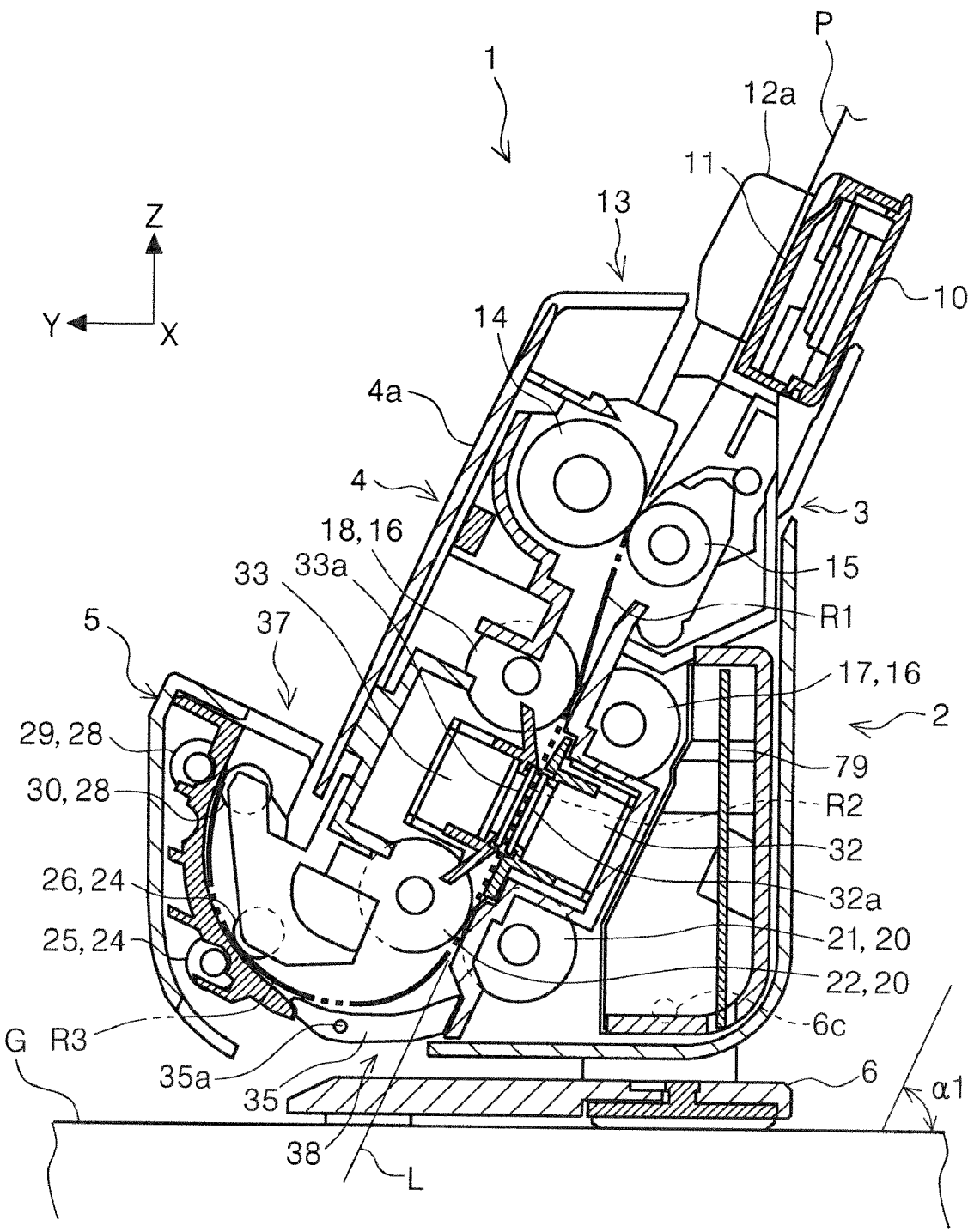
FIG. 5 is a cross-sectional view of a document transporting path of the scanner in which the apparatus main body is in the normal reading posture as viewed from the width direction.
Figure 6:
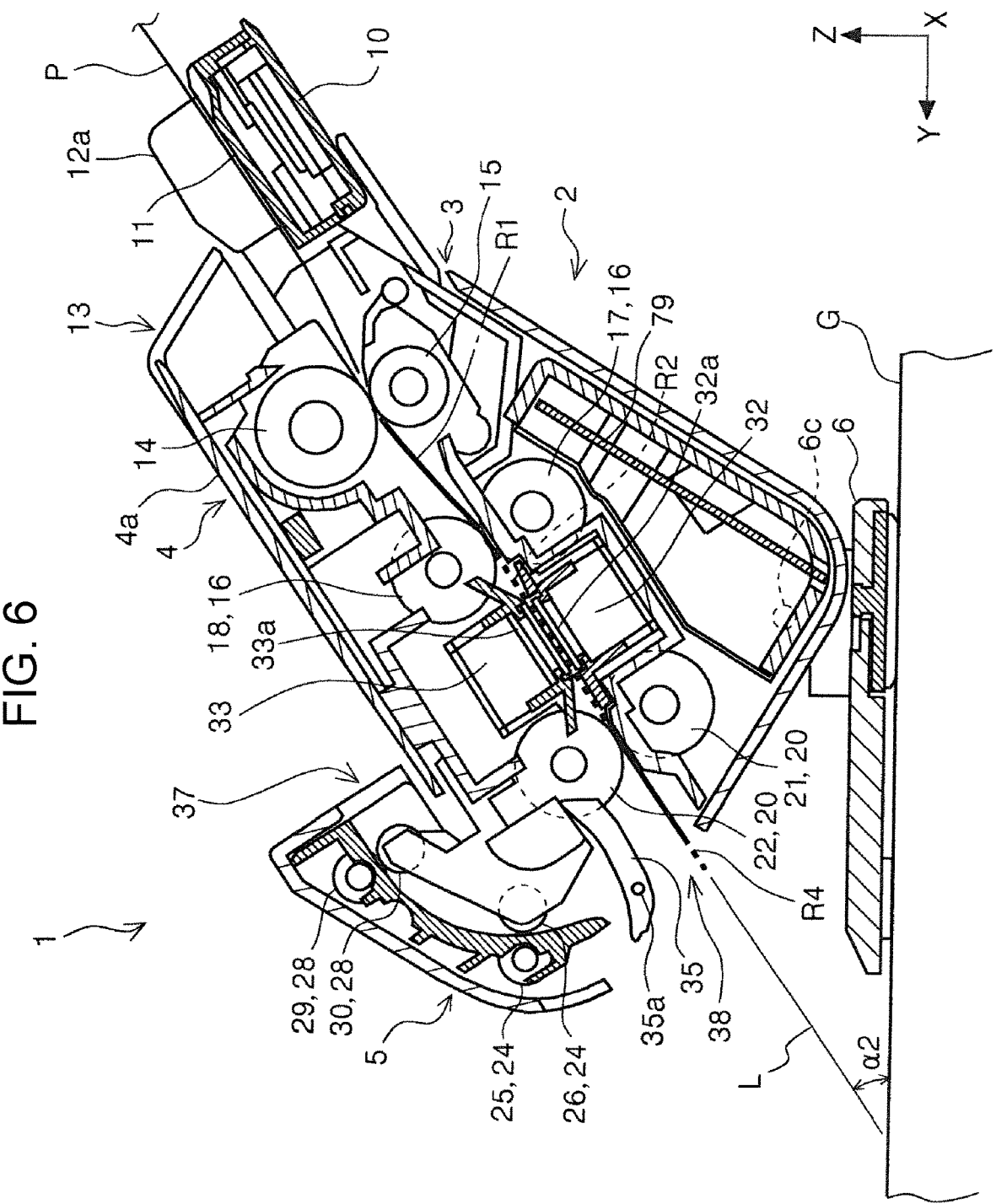
FIG. 6 is a cross-sectional view of the document transporting path of the scanner in which the apparatus main body is in a booklet reading posture as viewed from the width direction.

The apparatus main body 2 is rotatable around the main body rotation shaft 6c with respect to the main body supporting portion 6 (see FIGS. 7 and 8), and in the present embodiment, the apparatus main body 2 is capable of maintaining two postures by the rotation of the apparatus main body 2. The two postures of the apparatus main body 2 are illustrated in FIGS. 5 and 6, and hereinafter, the posture in FIG. 5 is referred to as a normal reading posture, and the posture in FIG. 6 is referred to as a booklet reading posture. The normal reading posture is an example of a first posture of the apparatus main body 2, and the booklet reading posture is an example of a second posture of the apparatus main body 2.

An angle $\alpha 1$ illustrated in FIG. 5 and an angle $\alpha 2$ illustrated in FIG. 6 are angles formed by the read transporting path R2 and a placement surface G of the apparatus, described later respectively. The angle $\alpha 2$ in the case of the booklet reading posture is smaller than the angle $\alpha 1$ in the case of the normal reading posture.

In the normal reading posture, a projected area of the apparatus main body 2 on the placement surface G on which the scanner 1 is placed is the smallest, that is, a footprint of the apparatus main body 2 is the smallest.

The footprint in the present specification is an occupied area of the apparatus main body 2 in the X-Y plane when the apparatus main body 2 is viewed from the above.

The normal reading posture is suitable for reading a document having a sheet shape, that is, a document having low rigidity and easy bending. The booklet reading posture is suitable for reading a document having high rigidity and hard bending such as a plastic card or a booklet.

An operation portion 7 that is configured with a plurality of operation buttons including a power button is provided on the front surface of the apparatus.

As illustrated in FIG. 2, a first coupling portion 71, a second coupling portion 72, and a third coupling portion 73 are provided on the side surface among the side surfaces configuring the periphery of the apparatus in the +X direction. The first coupling portion 71 is a coupling portion to which a USB Type-A plug (not illustrated), which is an example of a coupling target, is coupled. The second coupling portion 72 is a coupling portion to which a USB Type-C plug (not illustrated), which is an example of a coupling target, is coupled. The third coupling portion 73 is a coupling portion to which a power plug (not illustrated) for supplying electric power to the apparatus main body 2 is coupled.

USB is an abbreviation for Universal Serial Bus, and Type-A and Type-C are one of a plurality of types defined in the USB standard, respectively.

An external apparatus can be coupled to the first coupling portion 71 via a USB cable (not illustrated), and a storage medium, for example, a USB memory (not illustrated) can be also coupled to the first coupling portion 71. The control portion 80 (see FIG. 12) can store read data in the storage medium that is coupled to the first coupling portion 71.

Further, the external apparatus can be coupled to the second coupling portion 72 via a USB cable (not illustrated).

The first coupling portion 71, the second coupling portion 72, and the third coupling portion 73 are provided on a circuit substrate 79 (see FIG. 7) positioned on the back surface side of the apparatus.

In the present embodiment, the apparatus main body 2 is configured to be able to receive the electric power from the external apparatus that is coupled to the second coupling portion 72.

Subsequently, the configuration of the document transporting path in the scanner 1 will be described with reference to FIGS. 5 and 6. The fed document is supported in an inclined posture by the document supporting portion 11. A reference numeral P indicates the supported document. When a plurality of documents are supported by the document supporting portion 11, the highest-level document is fed downstream by a feeding roller 14. The document supporting portion 11 is formed in an upper opening/closing portion 10. The upper opening/closing portion 10 is rotatable around a rotation shaft (not illustrated), and a feeding port 13 is opened/closed by the rotation of the upper opening/closing portion 10. FIG. 1 illustrates a state in which the upper opening/closing portion 10 is closed, and FIG. 2 illustrates a state in which the upper opening/closing portion 10 is opened. The upper opening/closing portion 10 configures the first unit 3.

As illustrated in FIG. 3, the document supporting portion 11 is provided with a pair of edge guides 12a and 12b that guides the side edges of the document. The pair of edge guides 12a and 12b is provided so as to be slidable in the document width direction (the X axis direction). The pair of edge guides 12a and 12b is provided so as to be in conjunction with a rack and pinion mechanism (not illustrated) such that the pair of edge guides 12a and 12b is separated from each other or close to each other with the center position in the document width direction interposed therebetween. That is, the scanner 1 adopts a so-called center feeding method.

Returning to FIGS. 5 and 6, the feeding roller 14 is provided in the second unit 4. The feeding roller 14 rotates by receiving power from a transporting motor 50 described later. A separation roller 15 is provided at a position facing the feeding roller 14 in the first unit 3. Rotational torque is applied to the separation roller 15 by a torque limiter (not illustrated), thereby the double feeding of the documents is suppressed.

The feeding roller 14 and the separation roller 15 are provided at the center position in the document width direction (see FIG. 4).

A separation pad may be provided instead of the separation roller 15.

Further, in the present embodiment, the feeding roller 14 is provided on the upper side of the documents placed on the document supporting portion 11 and the document is fed from the top document, but the feeding roller 14 may be provided at the lower side of the documents placed on the document supporting portion 11 and the document may be fed from the bottom document.

The separation roller 15 can have a separation state in which the rotational torque is generated by the action of a torque limiter 98 (see FIG. 16) and a non-separation state in which the action of the torque limiter 98 is not generated. A separation switching section 100 (see FIGS. 14 and 17), which will be described later, switches a state between the separation state in which the separation roller 15 separates the documents and the non-separation state in which the separation roller 15 does not separate the documents. The separation switching section 100 puts the separation roller 15 in the separation state when the apparatus main body 2 is in the normal reading posture and puts the separation roller 15 in the non-separation state when the apparatus main body 2 is in the booklet reading posture.

The separation switching section 100 will be described in detail later.

A pair of first transporting rollers 16 is provided downstream of the feeding roller 14 and the separation roller 15. The pair of first transporting rollers 16 is configured with a first lower roller 17 provided in the first unit 3 and a first upper roller 18 provided in the second unit 4. The first upper roller 18 is provided so as to be capable of advancing and retreating with respect to the first lower roller 17 and is pressed toward the first lower roller 17 by a pressing member (not illustrated), for example, a coil spring.

Both the first lower roller 17 and the first upper roller 18 rotate by receiving the power from the transporting motor 50 described later. Two sets of first lower roller 17 and first upper roller 18 are provided so as to interpose the center position in the document width direction, respectively (see FIG. 4).

When the second unit 4 is closed with respect to the first unit 3, the first lower roller 17 and the first upper roller 18 come into contact with each other. When the second unit 4 is opened with respect to the first unit 3, the first upper roller 18 is separated from the first lower roller 17.

A first reading portion 32 and a second reading portion 33 are disposed to face each other downstream of the pair of first transporting rollers 16. The first reading portion 32 is provided in the first unit 3, and the second reading portion 33 is provided in the second unit 4. The first reading portion 32 reads a lower side (the first side) of the document supported by the document supporting portion 11, and the second reading portion 33 reads an upper side (the second side) of the document supported by the document supporting portion 11. The second reading portion 33 is provided so as to be capable of advancing and retreating with respect to the first reading portion 32 and is pressed toward the first reading portion 32 by the pressing member (not illustrated), for example, the coil spring.

In the present embodiment, the first reading portion 32 and the second reading portion 33 are configured with a contact type image sensor module (CISM). A reference numeral 32a is a contact glass configuring the first reading portion 32, and reference numeral 33a is a contact glass configuring the second reading portion 33.

A pair of second transporting rollers 20 is provided downstream of the first reading portion 32 and the second reading portion 33. The pair of second transporting rollers 20 is configured with a second lower roller 21 provided in the first unit 3 and a second upper roller 22 provided in the second unit 4. The second upper roller 22 is provided so as to be capable of advancing and retreating with respect to the second lower roller 21 and is pressed toward the second lower roller 21 by the pressing member (not illustrated), for example, the coil spring.

Both the second lower roller 21 and the second upper roller 22 rotate by receiving the power from the transporting motor 50 described later. Two sets of second lower roller 21 and second upper roller 22 are provided so as to interpose the center position in the document width direction, respectively (see FIG. 4).

When the second unit 4 is closed with respect to the first unit 3, the second lower roller 21 and the second upper roller 22 come into contact with each other. When the second unit 4 is opened with respect to the first unit 3, the second upper roller 22 is separated from the second lower roller 21.

In FIGS. 5 and 6, an alternate long and short dash line indicated by the reference numeral R1 is the document feeding path, and the document feeding path R1 is defined from a nip position between the feeding roller 14 and the separation roller 15 to a nip position between the pair of first transporting rollers 16. Further, in FIGS. 5 and 6, a broken line indicated by the reference numeral R2 is a read transporting path, and the read transporting path R2 is defined from a nip position between the pair of first transporting rollers 16 to a nip position between the pair of second transporting rollers 20. The read transporting path R2 is the document transporting path facing the first reading portion 32 and the second reading portion 33.

When the apparatus main body 2 is in the normal reading posture illustrated in FIG. 5, the inversion transporting path R3, which is used when the read document is inverted upward and ejected, is formed downstream of the read transporting path R2. The inversion transporting path R3 is the document transporting path positioned downstream from the nip position between the pair of second transporting rollers 20, and as illustrated by a two-dot chain line in FIG. 5, is the document transporting path for bending and inverting the document, which is transported in the diagonally downward direction and ejecting the document in the diagonally upward direction from a first ejection port 37.

When the apparatus main body 2 is in the booklet reading posture illustrated in FIG. 6, a non-inversion transporting path R4, which is used when the read document is ejected without being inverted, is formed downstream of the read transporting path R2. The non-inversion transporting path R4 is the document transporting path positioned downstream from the nip position between the pair of second transporting rollers 20, and as illustrated by a two-dot chain line in FIG. 6, is the document transporting path for ejecting the document, which is transported in the diagonally downward direction in the read transporting path R2, in the diagonally downward direction from a second ejection port 38 without bending and inverting.

The pair of second transporting rollers 20 functions as a pair of ejection rollers that ejects the document from the non-inversion transporting path R4.

Switching between the inversion transporting path R3 and the non-inversion transporting path R4 is performed by using a flap 35 as a flap member configuring a transporting path switching section. The flap 35 is rotatable about a flap rotation shaft 35a, and by the rotation, the flap 35 couples the inversion transporting path R3 to the read transporting path R2 and couples the non-inversion transporting path R4 to the read transporting path R2. Coupling the inversion transporting path R3 to the read transporting path R2 means to make the inversion transporting path R3 a usable state, or to make the non-inversion transporting path R4 an unusable state. Similarly, coupling the non-inversion transporting path R4 to the read transporting path R2 means to make the non-inversion transporting path R4 a usable state, or to make the inversion transporting path R3 an unusable state.

In the present embodiment, the flap 35 is configured to be rotated in conjunction with the posture switching of the apparatus main body 2. In the present embodiment, a first solenoid 86 (see FIG. 12) is adopted as a configuration in which the flap 35 is rotated in conjunction with the posture switching of the apparatus main body 2. The control portion 80 (see FIG. 12), which performs various controls, detects the posture of the apparatus main body 2 based on a detection signal of a first posture detection sensor 87 or a second posture detection sensor 88 described later, and rotates the flap 35 by driving the first solenoid 86 based on the detection. The method for rotating the flap 35 is not limited to the first solenoid 86 but may be another actuator such as a motor. Alternatively, the flap 35 may be configured to be rotated mechanically in conjunction with the posture of the apparatus main body 2.

The inversion transporting path R3 is provided with a pair of third transporting rollers 24 and a pair of fourth transporting rollers 28.

The pair of third transporting rollers 24 is configured with a third driving roller 25 provided in the third unit 5 and a third driven roller 26 provided in the second unit 4. The third driven roller 26 is provided so as to be capable of advancing and retreating with respect to the third driving roller 25 and is pressed toward the third driving roller 25 by the pressing member (not illustrated), for example, the coil spring. The third driving roller 25 is driven by the transporting motor 50. The third driven roller 26 is a roller that is driven to rotate.

The pair of fourth transporting rollers 28 is configured with a fourth driving roller 29 provided in the third unit 5 and a fourth driven roller 30 provided in the second unit 4. The fourth driven roller 30 is provided so as to be capable of advancing and retreating with respect to the fourth driving roller 29 and is pressed toward the fourth driving roller 29 by the pressing member (not illustrated), for example, the coil spring. The fourth driving roller 29 is driven by the transporting motor 50. The fourth driven roller 30 is a roller that is driven to rotate.

Two sets of third driving roller 25, the third driven roller 26, the fourth driving roller 29, and the fourth driven roller 30 are provided so as to interpose the center position in the document width direction, respectively (see FIG. 3).

When the third unit 5 is closed with respect to the second unit 4, the third driving roller 25 and the third driven roller 26 come into contact with each other, and the fourth driving roller 29 and the fourth driven roller 30 also come into contact with each other. When the third unit 5 is opened with respect to the second unit 4, the third driving roller 25 and the third driven roller 26 are separated from each other, and the fourth driving roller 29 and the fourth driven roller 30 are also separated from each other.

The document, which is transported on the inversion transporting path R3, is ejected diagonally upward including the −Y direction component by the pair of fourth transporting rollers 28 and is supported in an inclined posture by an upper surface 4a of the second unit 4.

Next, a configuration for rotating the apparatus main body 2 will be described. In the present embodiment, the apparatus main body 2 rotates by using the power of the posture switching motor 40 (see FIGS. 7 to 10) under the control of the control portion 80 and switches the posture. The control portion 80 controls the posture switching motor 40 based on input information from the external apparatus 500 that is coupled to the scanner 1.

Figure 7:
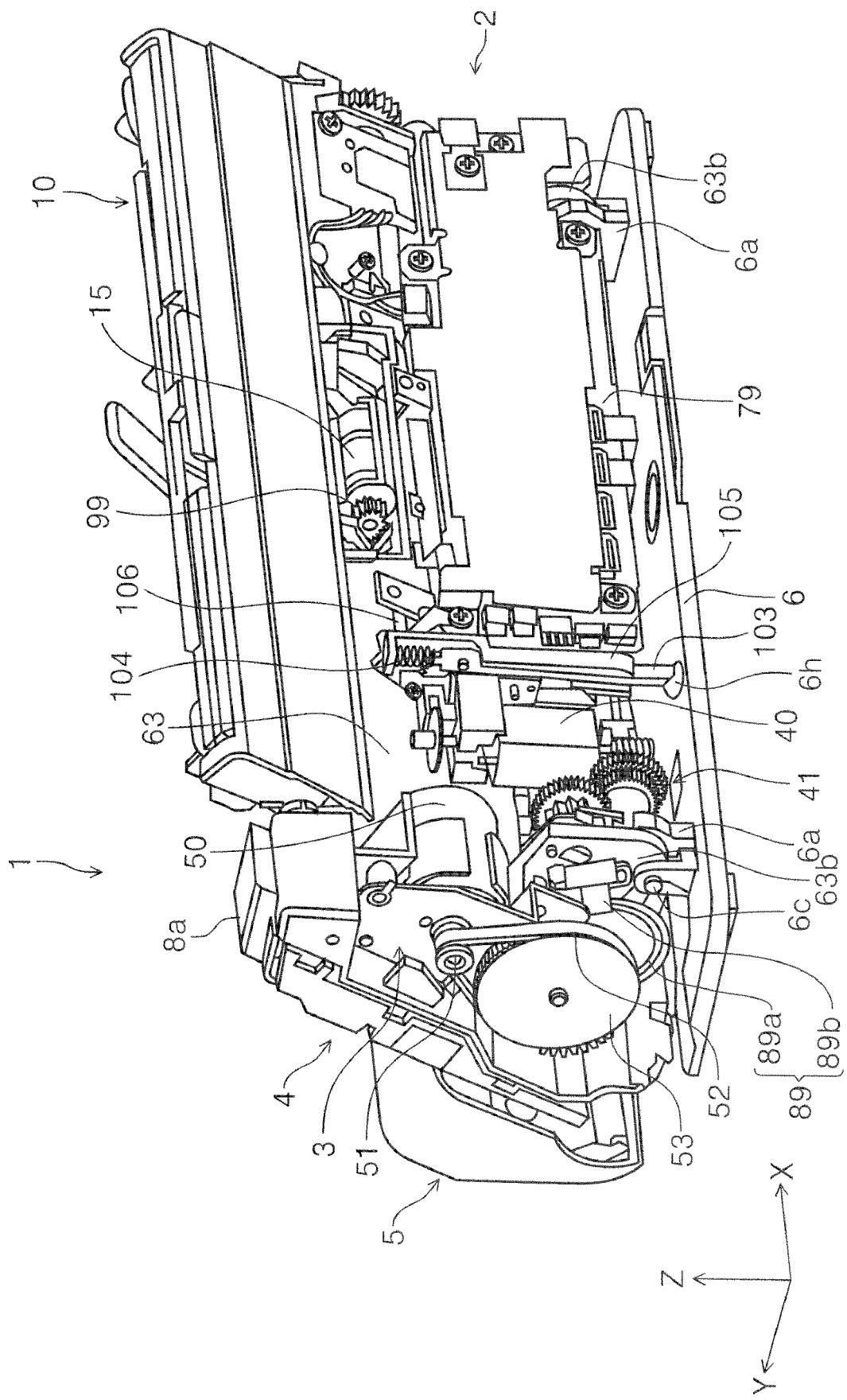
FIG. 7 is a perspective view of the scanner in which a back surface cover of a first unit is removed as viewed from the rear.

FIG. 7 illustrates a state in which a back surface cover 66 (see FIG. 2) configuring the external appearance of the back surface of the apparatus is removed. The reference numeral 41 indicates a rotation converting section for converting the rotation of the posture switching motor 40 into the rotation of the apparatus main body 2. The posture switching motor 40 and the rotation converting section 41 are provided closer to the side surface in the −X direction in the apparatus width direction. In the apparatus width direction, closer to the side surface in the −X direction means that the posture switching motor 40 and the rotation converting section 41 are positioned in the −X direction from the apparatus center position in the X axis direction.

A first frame 63 configuring a substrate of the first unit 3 is provided with two support target portions 63b at intervals in the X axis direction. The main body supporting portion 6 is provided with two main body rotation shafts 6c at intervals in the X axis direction. The first frame 63, that is, the apparatus main body 2, is rotatable about the main body rotation shaft 6c by the main body rotation shaft 6c passing through the support target portion 63b. The main body rotation shaft 6c is a rotation shaft forming the center of the rotation shaft parallel to the X axis direction.

The posture switching motor 40 is provided in the first frame 63. The first frame 63 has a shape along the read transporting path R2. The posture switching motor 40 is provided on the back surface side of the first frame 63 that is provided in the inclined posture.

Figure 8:
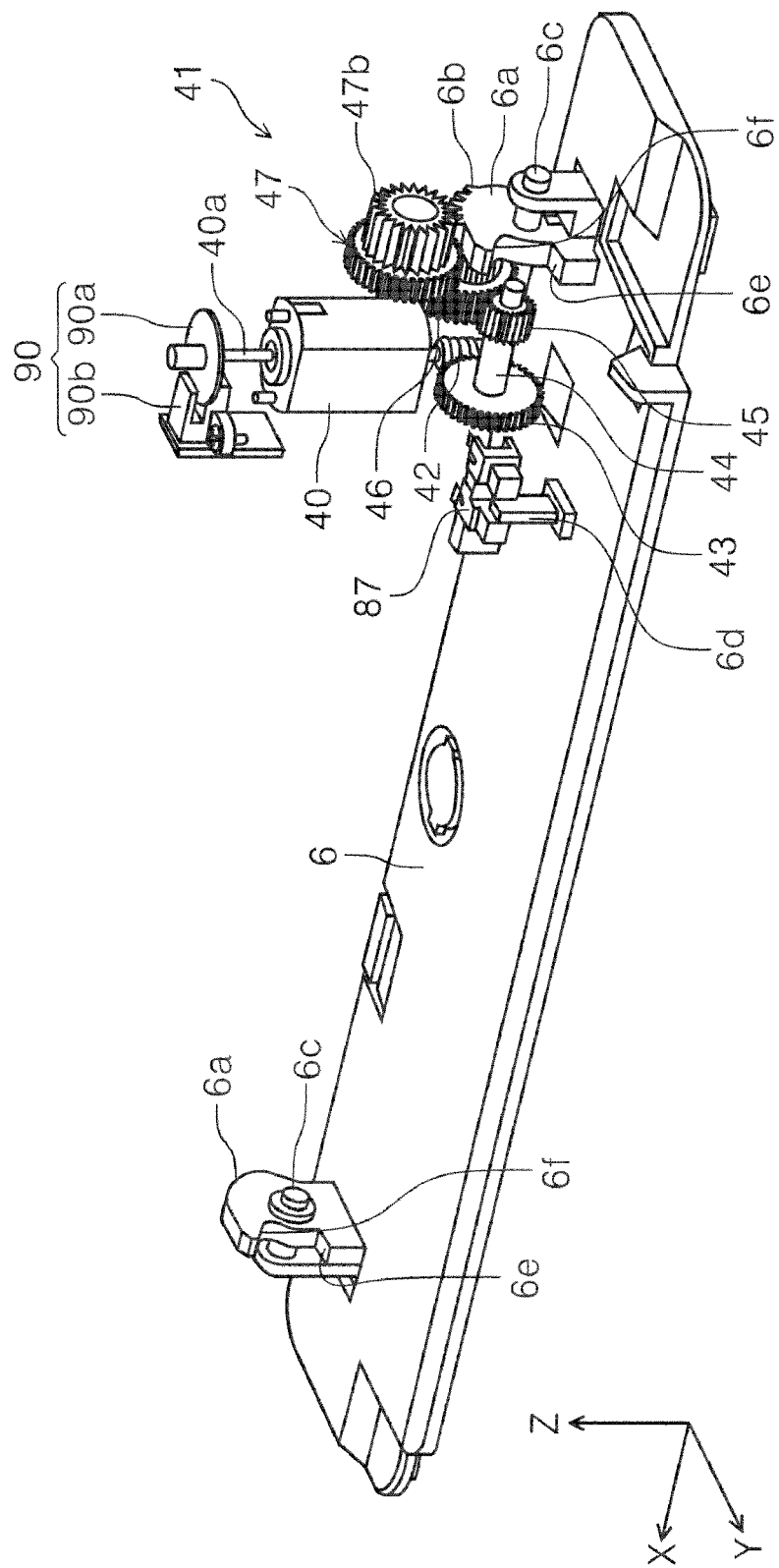
FIG. 8 is a perspective view illustrating a configuration of a posture switching motor and a rotation converting section.
Figure 9:
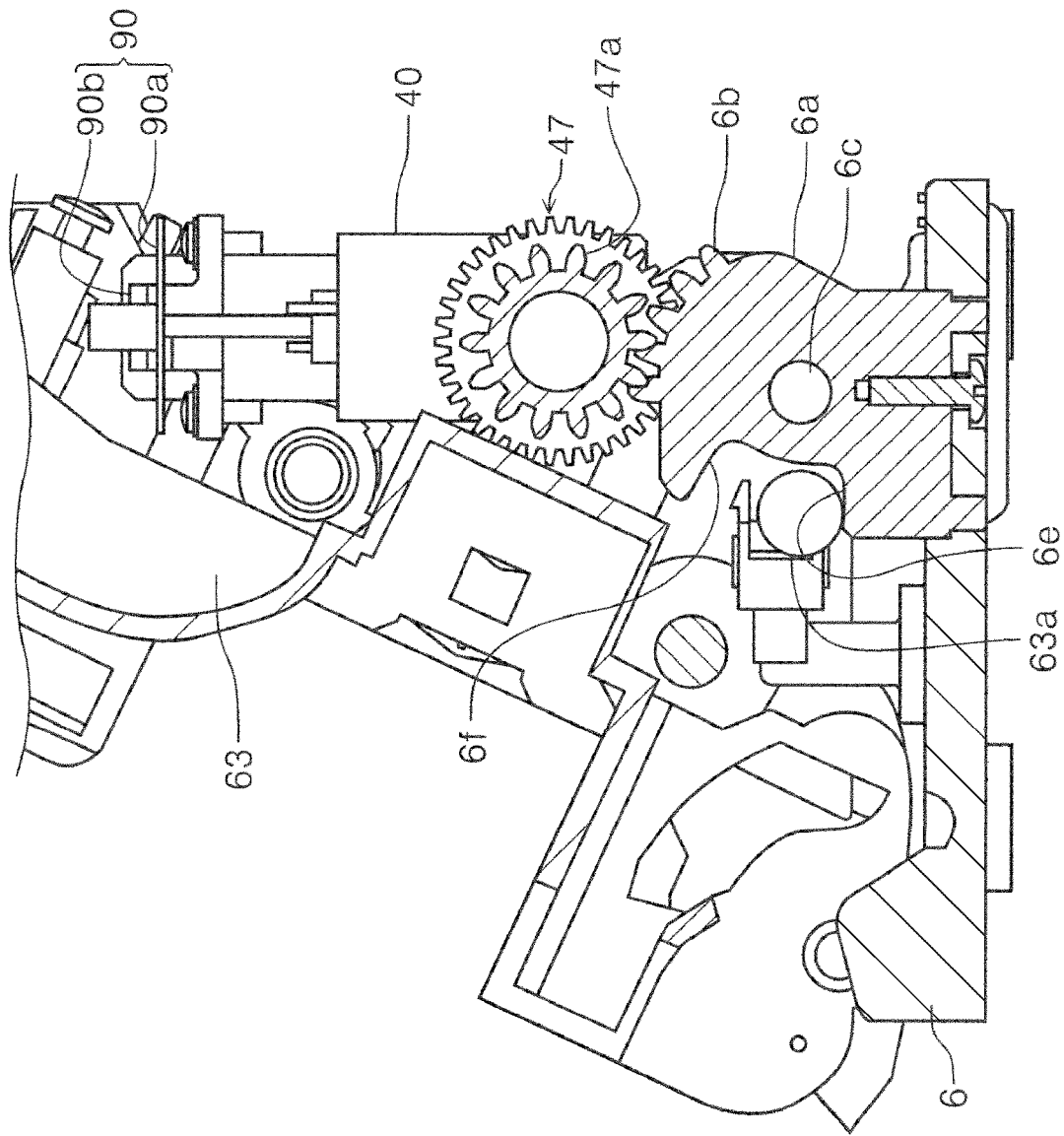
FIG. 9 is a cross-sectional view of configurations of the posture switching motor and the rotation converting section when the apparatus main body is in the normal reading posture as viewed from the width direction.
Figure 10:
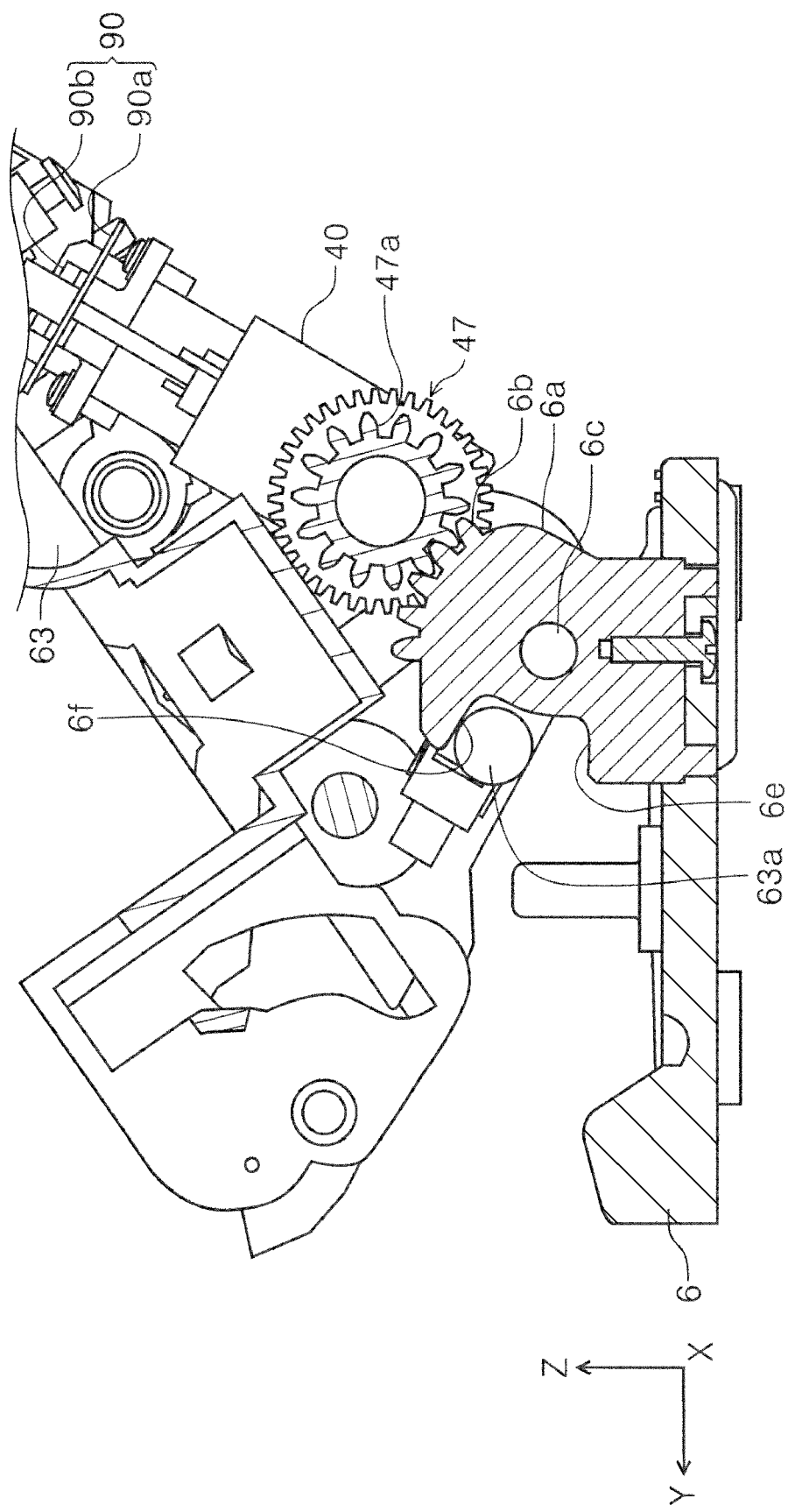
FIG. 10 is a cross-sectional view of configurations of the posture switching motor and the rotation converting section when the apparatus main body is in the booklet reading posture as viewed from the width direction.

In FIG. 8, the rotation converting section 41 has a toothed wheel 47b that is a toothed wheel rotatably provided in the first unit 3 and that rotates by the power of the posture switching motor 40, and a toothed portion 6b that is a toothed portion fixed to the main body supporting portion 6 and that meshes with the toothed wheel 47b.

The toothed portion 6b is a toothed portion formed around the main body rotation shaft 6c in a vertical wall portion 6a. The vertical wall portion 6a is a member configuring the main body supporting portion 6.

More specifically, a worm gear 42 is provided on a rotation shaft of the posture switching motor 40, and power is transmitted from the worm gear 42 to the toothed wheel 43. The toothed wheel 43 is integrally configured with the toothed wheel 45 via a shaft 44. The toothed wheel 45 transmits the power to a first compound toothed wheel 46, and the first compound toothed wheel 46 transmits the power to a second compound toothed wheel 47. The toothed wheel 47b configures a part of the second compound toothed wheel 47.

A configuration excluding the toothed portion 6b, among the configurations of the posture switching motor 40 and the rotation converting section 41 described above, is provided in the first unit 3, that is, the apparatus main body 2. Therefore, when the toothed wheel 47b rotates by the power of the posture switching motor 40, the apparatus main body 2 rotates as indicated by the change from FIG. 9 to FIG. 10 or the change from FIG. 10 to FIG. 9, and the posture is switched.

In the present embodiment, the configuration excluding the toothed portion 6b, among the configurations of the posture switching motor 40 and the rotation converting section 41 described above, is provided in the first unit 3, that is, the apparatus main body 2, and the toothed portion 6b is provided in the main body supporting portion 6, but instead of the above disposition, the configuration excluding the toothed portion 6b, among the configurations of the posture switching motor 40 and the rotation converting section 41 described above, may be provided in the main body supporting portion 6, and the toothed portion 6b may be provided in the apparatus main body 2.

The vertical wall portion 6a is formed with a first contact portion 6e as a first rotation regulating section and a second contact portion 6f as a second rotation regulating section. A boss 63a, that is provided on the first frame 63, is inserted between the first contact portion 6e and the second contact portion 6f. When the apparatus main body 2 rotates from the booklet reading posture illustrated in FIG. 10 toward the normal reading posture illustrated in FIG. 9, the boss 63a comes into contact with the first contact portion 6e, and then the normal reading posture of the apparatus main body 2 is defined. Further, when the apparatus main body 2 rotates from the normal reading posture illustrated in FIG. 9 toward the booklet reading posture illustrated in FIG. 10, the boss 63a comes into contact with the second contact portion 6f, and then the booklet reading posture of the apparatus main body 2 is defined.

When the boss 63a comes into contact with the first contact portion 6e, or when the boss 63a comes into contact with the second contact portion 6f, a drive current value of the posture switching motor 40 increases. Therefore, the control portion 80 (see FIG. 12) can detect the posture of the apparatus main body 2 based on the rotational direction and the increased drive current value of the posture switching motor 40. In the present embodiment, a first posture detection sensor 87 and a second posture detection sensor 88, which will be described later, are provided, and the control portion 80 can also detect the posture of the apparatus main body 2 based on detection signals of these sensors.

The normal reading posture and the booklet reading posture of the apparatus main body 2 are maintained by supplying electric power to the stopped posture switching motor 40 and by being in a hold state.

The first posture detection sensor 87 is an optical sensor and is provided on the first frame 63, that is, the apparatus main body 2. When the apparatus main body 2 is in the normal reading posture, a protrusion 6d, which is provided on the main body supporting portion 6, blocks the optical axis of the first posture detection sensor 87 as illustrated in FIG. 8. When the apparatus main body 2 rotates toward the booklet reading posture from the above state, the protrusion 6d is displaced from the optical axis of the first posture detection sensor 87.

Figure 11A:
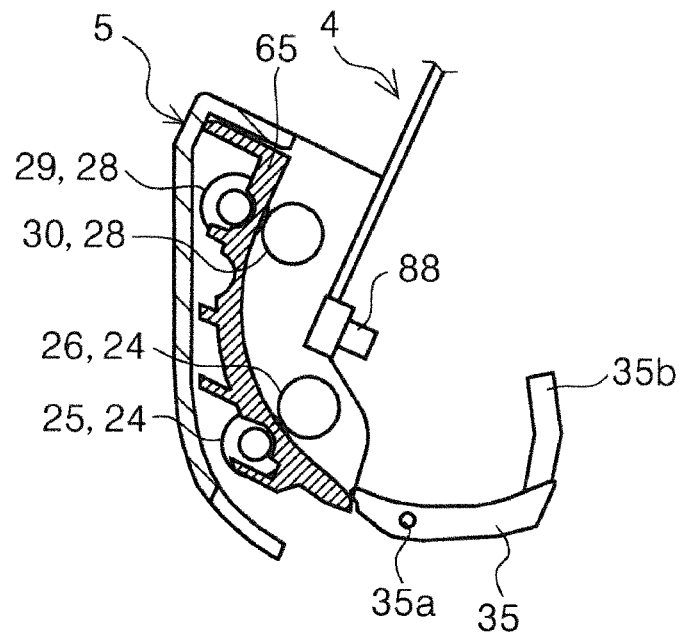
FIGS. 11A and 11B are diagrams illustrating a second posture detection sensor.
Figure 11B:
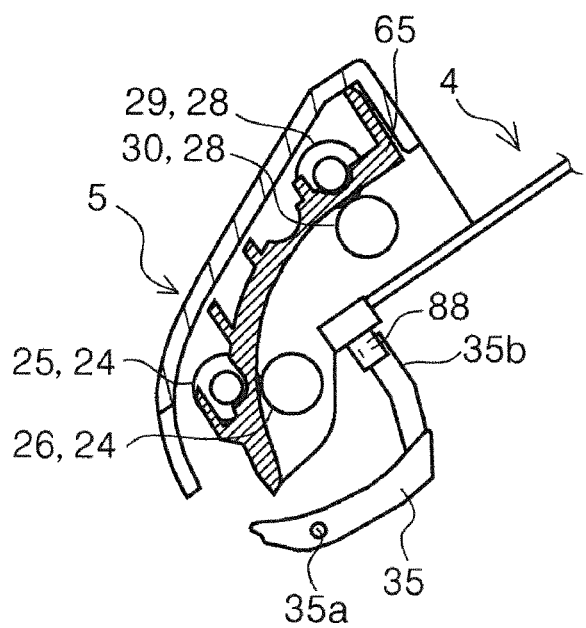

As illustrated in FIGS. 11A and 11B, the second posture detection sensor 88 is provided in the second unit 4. A detection target portion 35b is formed in the flap 35, and when the apparatus main body 2 is in the normal reading posture, the detection target portion 35b is displaced from the optical axis of the second posture detection sensor 88 as illustrated in FIG. 11A. When the apparatus main body 2 rotates toward the booklet reading posture from the above state, the detection target portion 35b blocks the optical axis of the second posture detection sensor 88 as illustrated in FIG. 11B.

As described above, the control portion 80 can detect the posture of the apparatus main body 2 based on the detection signal of the first posture detection sensor 87 and the detection signal of the second posture detection sensor 88.

In the above-described embodiment, the posture of the apparatus main body 2 is switched by the power of the posture switching motor 40, but instead of or in addition to this, the user may switch the posture of the apparatus main body 2 by applying a force to the apparatus main body 2.

Figure 13:
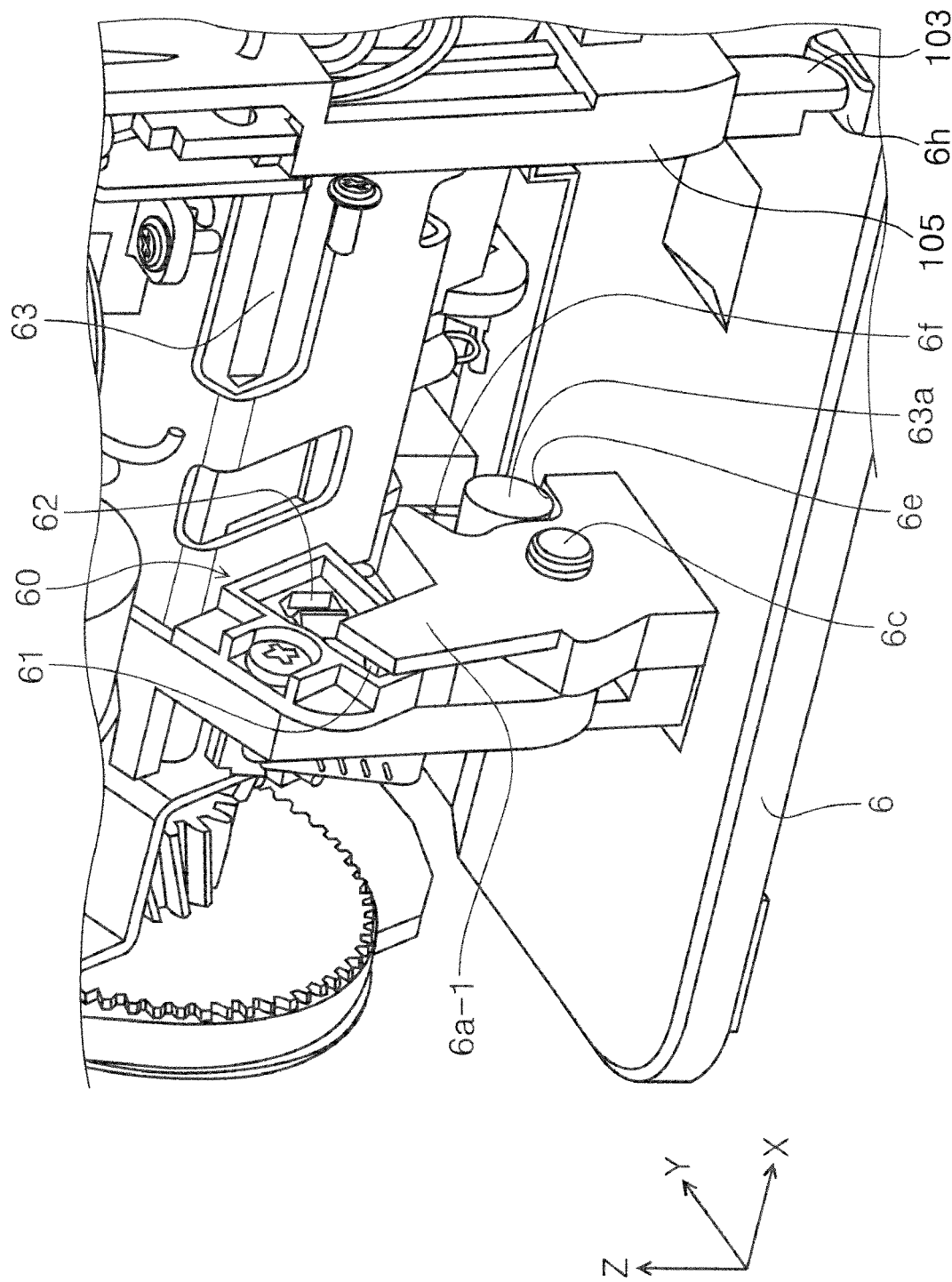
FIG. 13 is a perspective view illustrating a posture maintaining section according to another embodiment.

FIG. 13 illustrates a configuration in which the posture of the apparatus main body 2 is switched by the user's operation, and the reference numeral 6a-1 indicates the vertical wall portion provided on the main body supporting portion 6. The first contact portion 6e and the second contact portion 6f are formed at the vertical wall portion 6a-1. When the boss 63a comes into contact with the first contact portion 6e, the normal reading posture of the apparatus main body 2 is defined, and when the boss 63a comes into contact with the second contact portion 6f, the booklet reading posture of the apparatus main body 2 is defined.

A protrusion 61 is provided on the vertical wall portion 6a-1. A recess portion 62 is formed in the first frame 63, and the protrusion 61 is inserted into the recess portion 62, so that the posture of the apparatus main body 2 is maintained. FIG. 13 illustrates the normal reading posture, and in FIG. 13, the protrusion 61 is inserted into the hidden recess portion, thereby the normal reading posture is maintained. The recess portion (not illustrated), the recess portion 62, and the protrusion 61 configure a posture maintaining section 60 that maintains the posture of the apparatus main body 2.

In the configuration in which the posture of the apparatus main body 2 is switched by the user operation, it is also preferable to provide the apparatus main body 2 with a handle portion for putting the user's hand.

Figure 12:
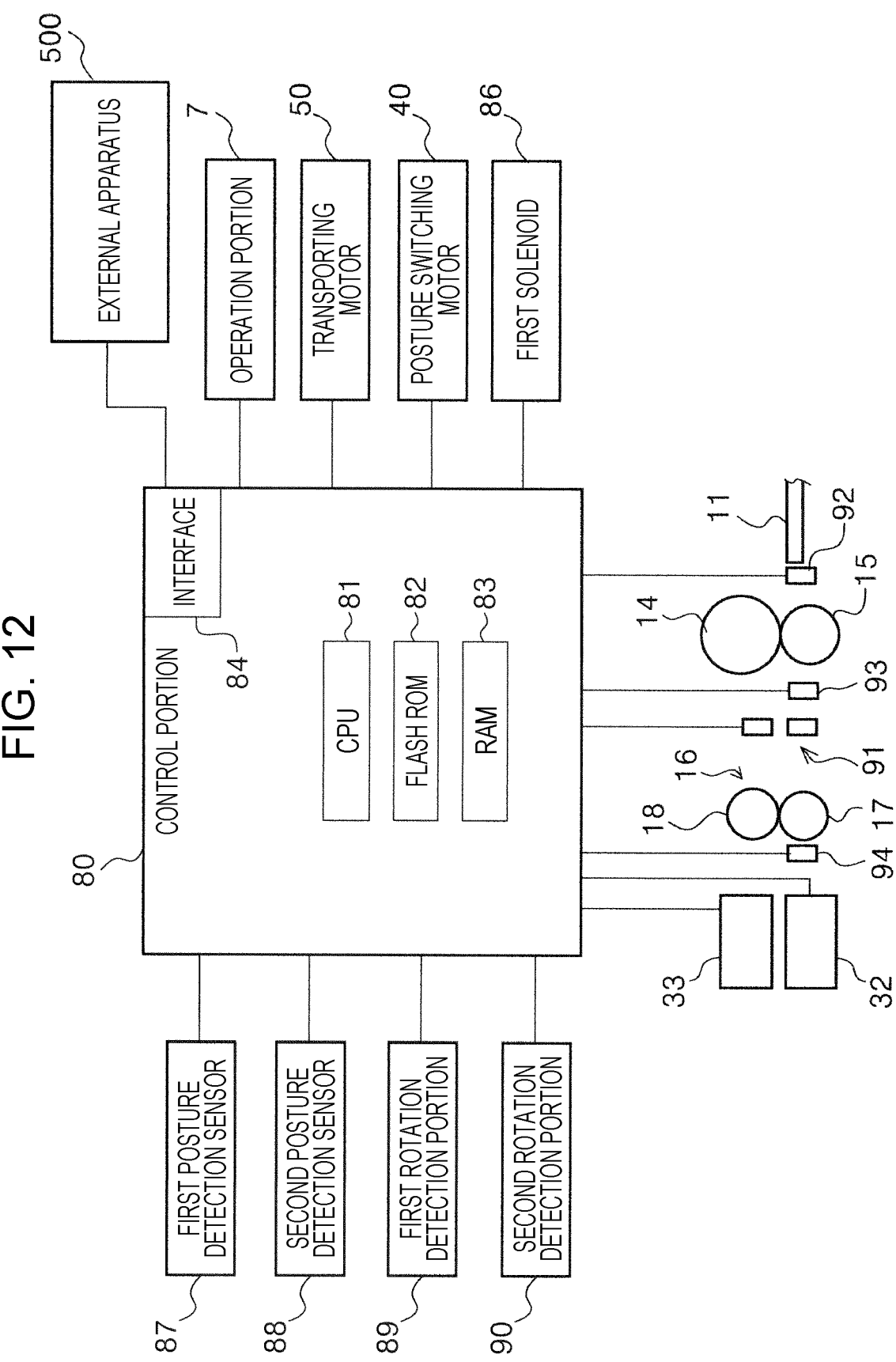
FIG. 12 is a block diagram illustrating a control system of the scanner.

Subsequently, the control system in the scanner 1 will be described with reference to FIG. 12.

The control portion 80 performs various other controls of the scanner 1 including feeding, transporting, ejection control, and read control of the document. A signal from the operation portion 7 is input to the control portion 80.

The control portion 80 controls the transporting motor 50 and the posture switching motor 40. In the present embodiment, each motor is a DC motor.

The read data from the first reading portion 32 and the second reading portion 33 is input to the control portion 80, and a signal for controlling each reading portion is transmitted from the control portion 80 to each reading portion.

Signals from detection sections of a placement detection portion 92, a double feeding detection portion 91, a first document detection portion 93, a second document detection portion 94, a first posture detection sensor 87, a second posture detection sensor 88, a first rotation detection portion 89, and a second rotation detection portion 90 are also input to the control portion 80.

As illustrated in FIG. 7, the first rotation detection portion 89 is a detection portion provided at an end portion of the apparatus main body 2 in the −X direction, and the control portion 80 can ascertain the rotation amount of each roller that is provided in the document transporting path by detecting the rotation amount of the transporting motor 50 by the first rotation detection portion 89.

The first rotation detection portion 89 is a rotary encoder that includes a rotation disk 89a and a detection portion 89b.

As illustrated in FIG. 8, the second rotation detection portion 90 is a rotary encoder that includes a rotation disk 90a provided on the rotation shaft 40a of the posture switching motor 40 and the detection portion 89b. The control portion 80 can ascertain the rotational direction and the rotation amount of the posture switching motor 40 by detecting the rotation amount of the posture switching motor 40 by the second rotation detection portion 90.

Returning to FIG. 12, the control portion 80 includes a CPU 81, a flash ROM 82, and a RAM 83. The CPU 81 performs various arithmetic processing according to a program stored in the flash ROM 82 and controls the entire operations of the scanner 1. The flash ROM 82, which is an example of a memory, is a non-volatile memory that can be read and written. Various information is temporarily stored in the RAM 83, which is an example of a memory.

An interface 84 included in the control portion 80 includes a first coupling portion 71 and a second coupling portion 72 described with reference to FIG. 2. The control portion 80 transmits or receives data to or from the external apparatus 500 via the interface 84.

Subsequently, each of the other detection portions will be described.

The placement detection portion 92 is a detection portion provided upstream of the feeding roller 14. The control portion 80 can detect the presence or absence of a document on the document supporting portion 11 by using a signal transmitted from the placement detection portion 92.

The first document detection portion 93 is a detection portion provided between the feeding roller 14 and the pair of first transporting rollers 16. The control portion 80 can detect a passage of the front end or the rear end of the document at the detection position by using the signal transmitted from the first document detection portion 93.

The double feeding detection portion 91 is a detection portion provided between the feeding roller 14 and the pair of first transporting rollers 16, and includes an ultrasonic wave transmitting portion and an ultrasonic wave receiving portion disposed so as to face each other with the document feeding path R1 interposed therebetween. The control portion 80 can detect the double feeding of the document by using the signal transmitted from the double feeding detection portion 91.

The second document detection portion 94 is a detection portion provided between the pair of first transporting rollers 16, and the first reading portion 32 and the second reading portion 33, and the control portion 80 can detect the passage of the front end or the rear end of the document at the detection position by using the signal transmitted from the second document detection portion 94.

Figure 25:
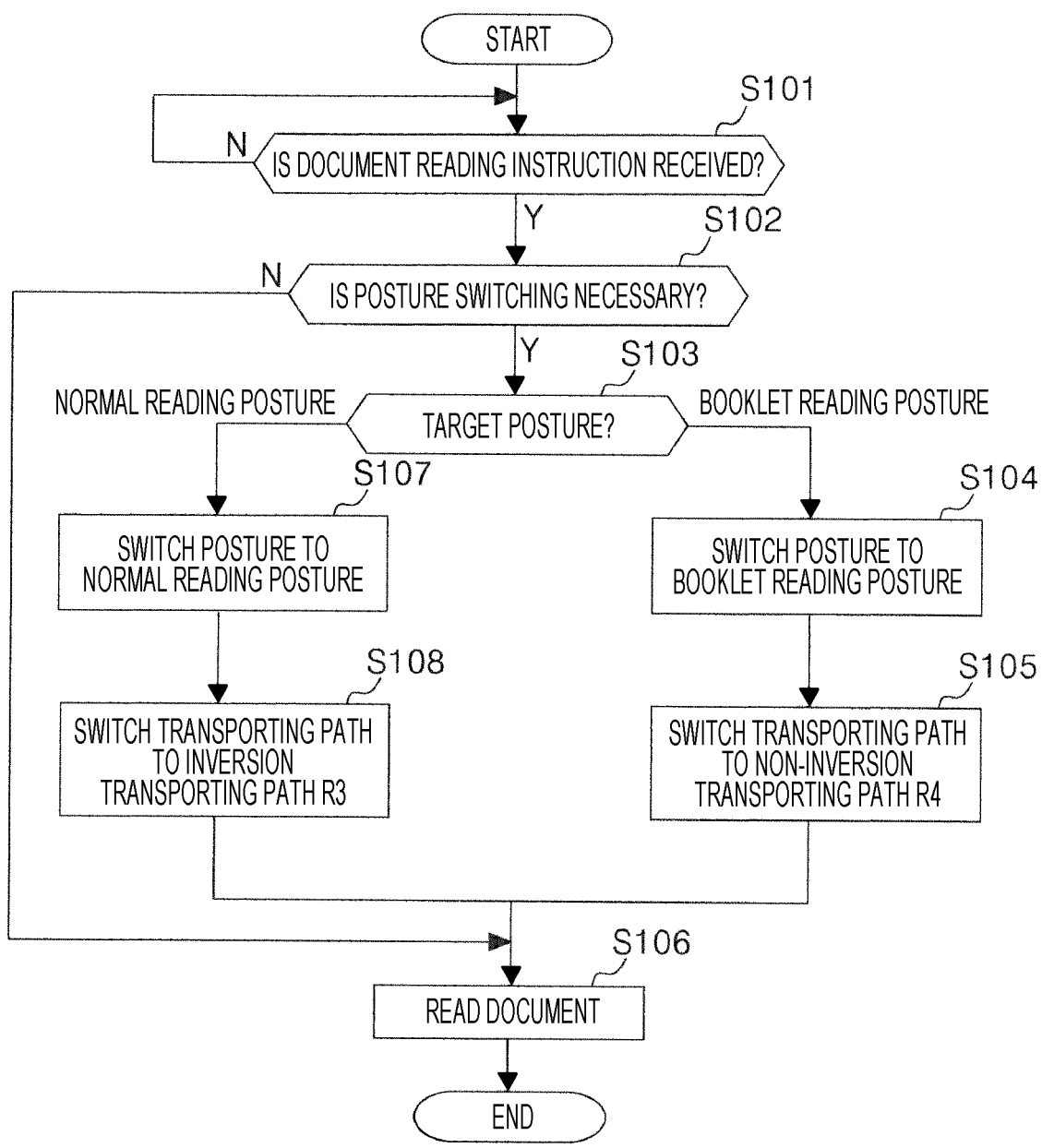
FIG. 25 is a flowchart illustrating control when posture switching of the apparatus main body is performed.

Next, an example of processing performed by the control portion 80 will be described with reference to FIG. 25. FIG. 25 is a flowchart illustrating the processing of the control portion 80 when the posture switching of the apparatus main body 2 is performed. In FIG. 25, when the control portion 80 receives a document reading instruction (Yes in step S101), the control portion 80 determines whether or not it is necessary to perform the posture switching of the apparatus main body 2 (step S102). It is assumed that the document reading instruction is received from the external apparatus 500 (see FIG. 12) as an example. In the external apparatus 500, the type of the document to be read can be set. The control portion 80 sets the posture of the apparatus main body 2 as the booklet reading posture when the type of the document to be read is a document having a card shape or a document having a booklet shape, and sets the posture of the apparatus main body 2 as the normal reading posture when the type of the document to be read is a document having a sheet shape.

In step S102, it is determined whether or not to switch the posture of the apparatus main body 2 by comparing the acquired document type with the current posture of the apparatus main body 2. As a result, in a case where the posture switching is unnecessary (No in step S102), the document is read without performing the posture switching control (step S106). In a case where the posture switching is necessary (Yes in step S102), based on a target posture (step S103), the control portion 80 switches the posture of the apparatus main body 2 to the booklet reading posture when the target posture is the booklet reading posture (step S104) and switches the document transporting path to the non-inversion transporting path R4 (step S105). Steps S104 and S105 may be executed at the same time. Thereafter, the document is read (step S106).

Further, based on the target posture (step S103), the control portion 80 switches the posture of the apparatus main body 2 to the normal reading posture when the target posture is the normal reading posture (step S107) and switches the document transporting path to the inversion transporting path R3 (step S108). Steps S107 and S108 may be executed at the same time. Thereafter, the document is read (step S106).

It is preferable to validate the detection information of the double feeding detection portion 91 when the apparatus main body 2 is in the normal reading posture, and invalidate the detection information of the double feeding detection portion 91 when the apparatus main body 2 is in the booklet reading posture.

As described above, the scanner 1 includes the main body supporting portion 6 that is placed on the placement surface G of the apparatus and the apparatus main body 2 that is supported by the main body supporting portion 6. The apparatus main body 2 includes the read transporting path R2 that is the document transporting path for transporting the document and that faces the first reading portion 32 and the second reading portion 33 reading the document, the inversion transporting path R3 that is the document transporting path downstream from the read transporting path R2 and is used when the read document is inverted upward and ejected, and the non-inversion transporting path R4 that is the document transporting path downstream from the read transporting path R2 and is used when the read document is ejected without being inverted. Further, the flap 35 that switches the document transporting path, which is coupled to the read transporting path R2, to either the inversion transporting path R3 or the non-inversion transporting path R4, is included.

The apparatus main body 2 is rotatably attached to the main body supporting portion 6 and is capable of being switched between the normal reading posture (FIG. 5) and the booklet reading posture (FIG. 6) in which an angle formed by the read transporting path R2 and the placement surface G is smaller than that of the normal reading posture, by the rotation of the apparatus main body 2. The flap 35 couples the read transporting path R2 to the inversion transporting path R3 when the apparatus main body 2 takes the normal reading posture and couples the read transporting path R2 to the non-inversion transporting path R4 when the apparatus main body 2 takes the booklet reading posture.

The scanner 1 can satisfactorily transport the document that is hard to bend by using the non-inversion transporting path R4. Examples of the document that is hard to bend include booklets, cards, and the like. The flap 35 couples the read transporting path R2 to the inversion transporting path R3 when the apparatus main body 2 takes the normal reading posture and couples the read transporting path R2 to the non-inversion transporting path R4 when the apparatus main body 2 takes the booklet reading posture. Thereby, an ejection direction of the document can be set to be along the placement surface G, rather than ejecting the document by using the non-inversion transporting path R4 when the normal reading posture is taken. As a result, it is possible to eject the document having a larger size as compared with the embodiment in which the document is ejected by using the non-inversion transporting path R4 when the normal reading posture is taken.

By setting the posture of the apparatus main body 2 in the normal reading posture, the angle that is formed by the read transporting path R2 and the placement surface G can be made larger than that of the booklet reading posture, and the footprint of the apparatus main body 2 can be suppressed.

The posture switching of the apparatus main body 2 may be performed by using a button configuring the operation portion 7. For example, in a case where one of the buttons configuring the operation portion 7 is assigned to a posture switching button and the posture switching button is pressed by the user when the current posture is the normal reading posture, the control portion 80 executes steps S104 and S105. Further, in a case where the posture switching button is pressed by the user when the current posture is the booklet reading posture, the control portion 80 controls the posture switching motor 40 and executes steps S107 and S108.

Of course, as described above, the posture switching of the apparatus main body 2 may be performed by the user applying a force to the apparatus main body 2. In this case, when the control portion 80 detects that the posture of the apparatus main body 2 is switched from the normal reading posture to the booklet reading posture, the control portion 80 executes steps S104 and S105. Alternatively, when the control portion 80 detects that the posture of the apparatus main body 2 is switched from the booklet reading posture to the normal reading posture, the control portion 80 executes steps S107 and S108.

Subsequently, the separation switching section 100 that switches a state between a separation state and a non-separation state of the separation roller 15 will be described.

Figure 14:
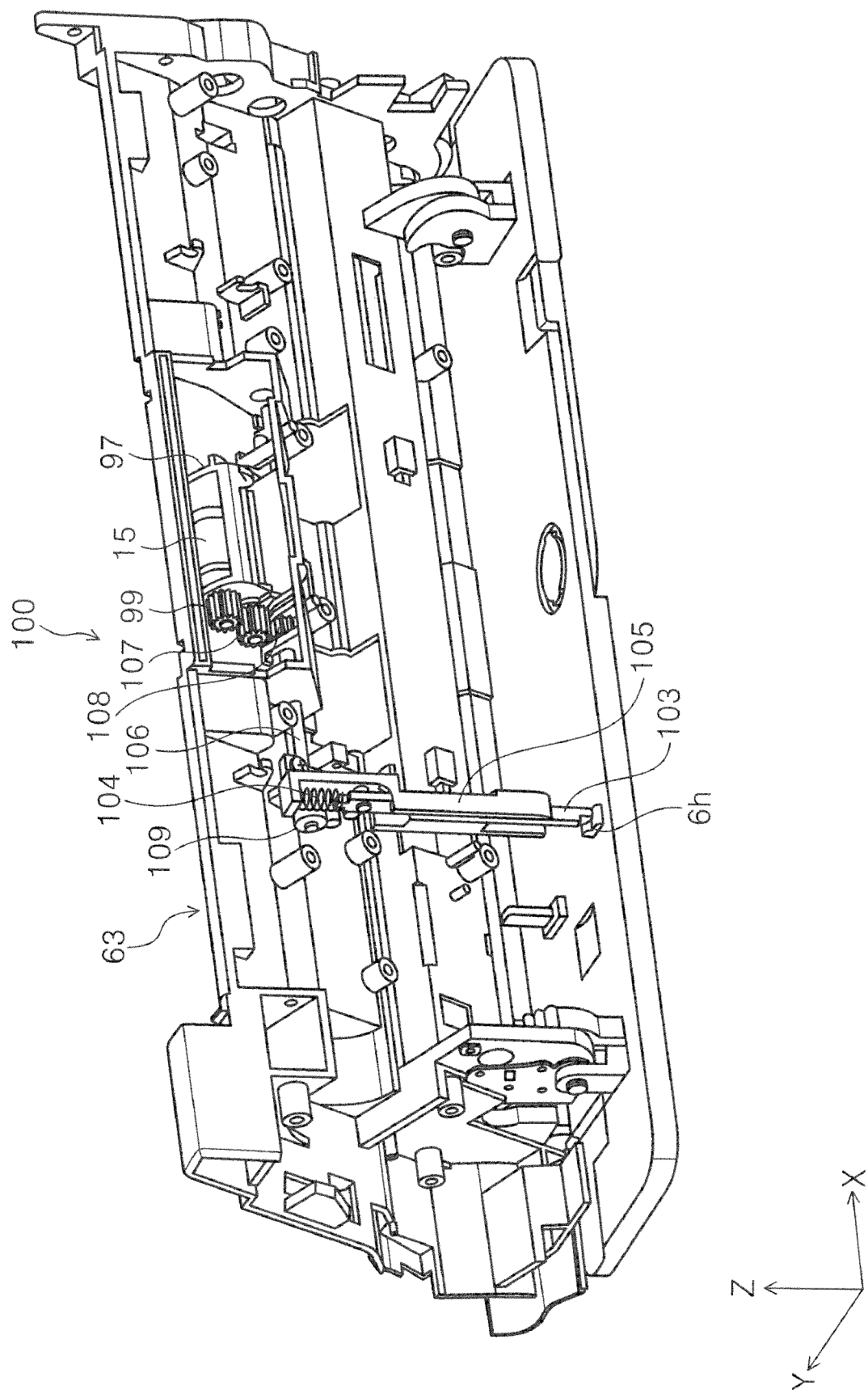
FIG. 14 is a perspective view of a first frame and a separation switching section (a first embodiment) as viewed from the rear.

As illustrated in FIGS. 7 and 14, the separation switching section 100 is provided in the −Y direction with respect to the first frame 63, that is, on the back surface of the first frame 63. The separation switching section 100 does not protrude in the −Y direction from a top portion of the first frame 63 in the +Z direction regardless of the posture of the apparatus main body 2, and is contained within an area formed at the back surface of the first frame 63.

The separation switching section 100 is positioned between the separation roller 15 and the rotation converting section 41 in the X axis direction. A part of the separation switching section 100 and a part of the rotation converting section 41 are at the same position in the Y axis direction.

Figure 15:
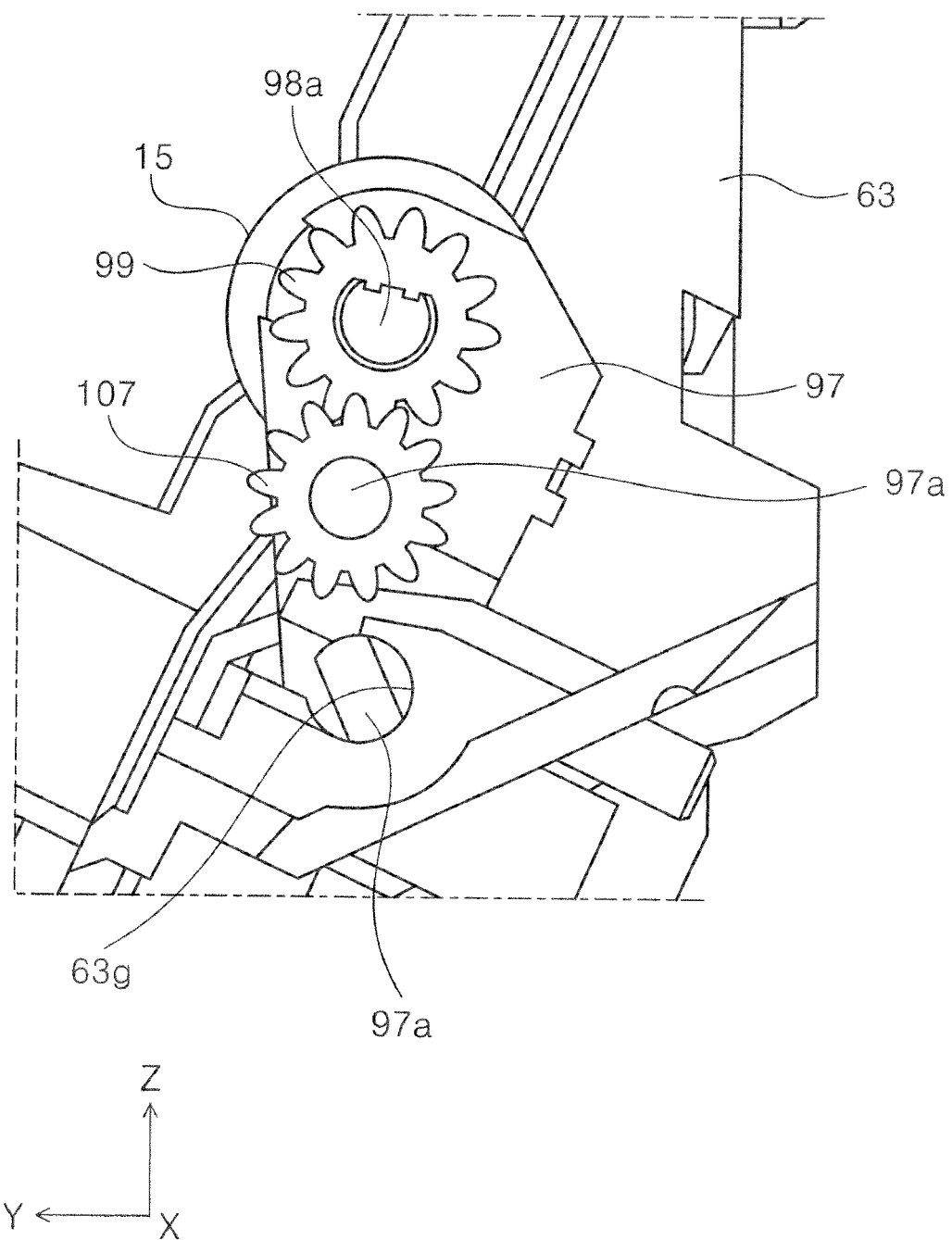
FIG. 15 is a side view of a roller holder.
Figure 16:
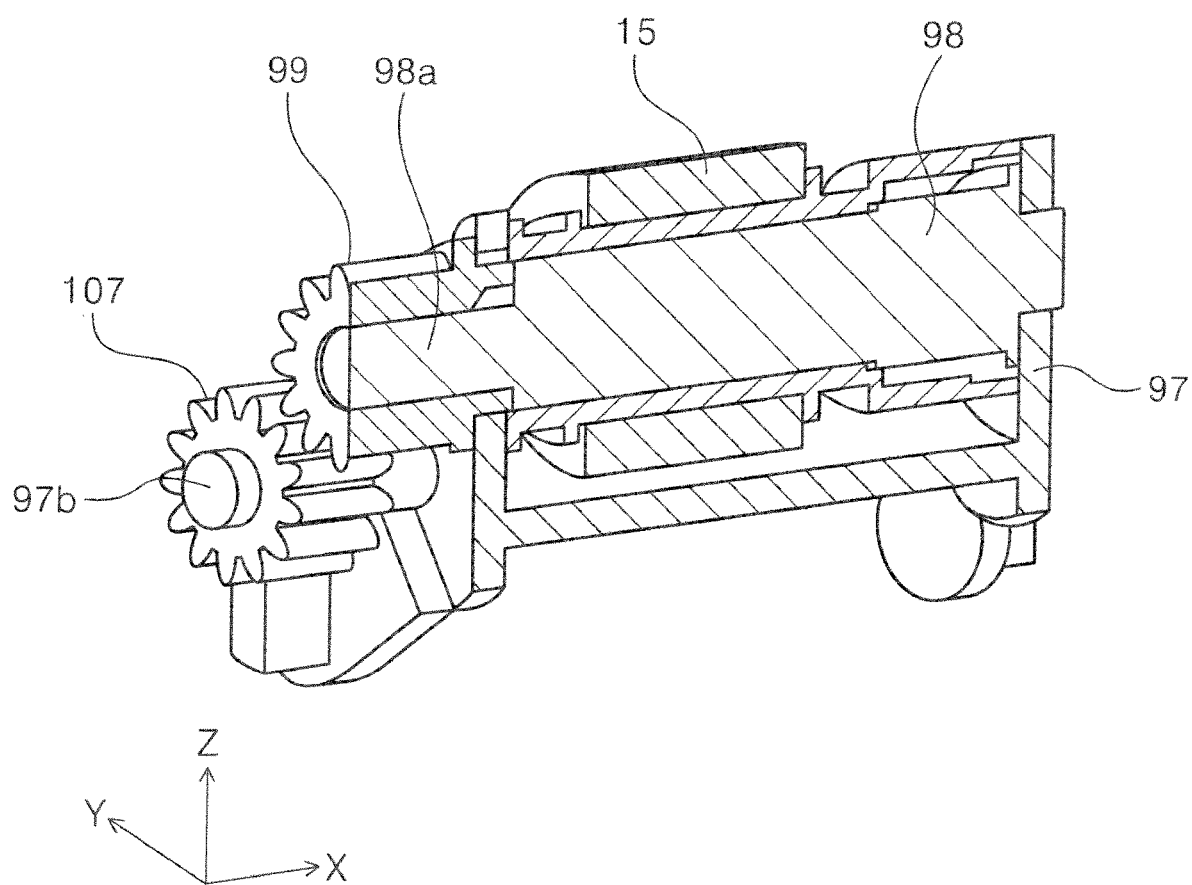
FIG. 16 is a cross-sectional perspective view of a separation roller, the roller holder, and a torque limiter.

As illustrated in FIG. 16, the separation roller 15 is rotatably provided in a roller holder 97. As illustrated in FIG. 15, a shaft portion 97a is integrally formed in the roller holder 97. The shaft portion 97a is a shaft in which the shaft center line is parallel to the X axis direction. The shaft portion 97a is pivotally supported by a bearing portion 63g formed in the first frame 63. As a result, the roller holder 97 is capable of swing around the shaft portion 97a, that is, the separation roller 15 is capable of advancing and retreating with respect to the feeding roller 14. The roller holder 97 is pressed in a direction in which the separation roller 15 advances into the feeding roller 14 by a pressing section (not illustrated), for example, a torsion spring.

As illustrated in FIG. 16, a torque limiter 98, which is an example of a resistance applying portion that applies the rotational resistance to the separation roller 15, is rotatably provided in the roller holder 97. The center line of the rotation shaft of the torque limiter 98 is parallel to the X axis direction. The separation roller 15 is provided with respect to the torque limiter 98, and the separation roller 15 receives a rotational torque from the torque limiter 98 in a state in which the rotation of the torque limiter 98 is regulated. That is, the separation state in which the separation of the documents is performed, is formed.

In a state in which the rotation of the torque limiter 98 is not regulated, the separation roller 15 rotates with the torque limiter 98 and does not receive the rotational torque from the torque limiter 98. That is, the non-separation state in which the separation of the documents is not performed, is formed.

The separation switching section 100 according to the present embodiment switches the state between the separation state and the non-separation state of the separation roller 15 by switching between the state in which the rotation of the torque limiter 98 in the roller holder 97 is regulated and the state in which the rotation is not regulated.

A shaft portion 98a is formed in the torque limiter 98, and a first toothed wheel 99 is fixedly provided on the shaft portion 98a. That is, the first toothed wheel 99 and the torque limiter 98 do not rotate relatively.

A shaft portion 97b is formed in the roller holder 97, and a second toothed wheel 107 is provided on the shaft portion 97b. The second toothed wheel 107 is rotatable with respect to the shaft portion 97b. The second toothed wheel 107 meshes with the first toothed wheel 99.

Figure 17:
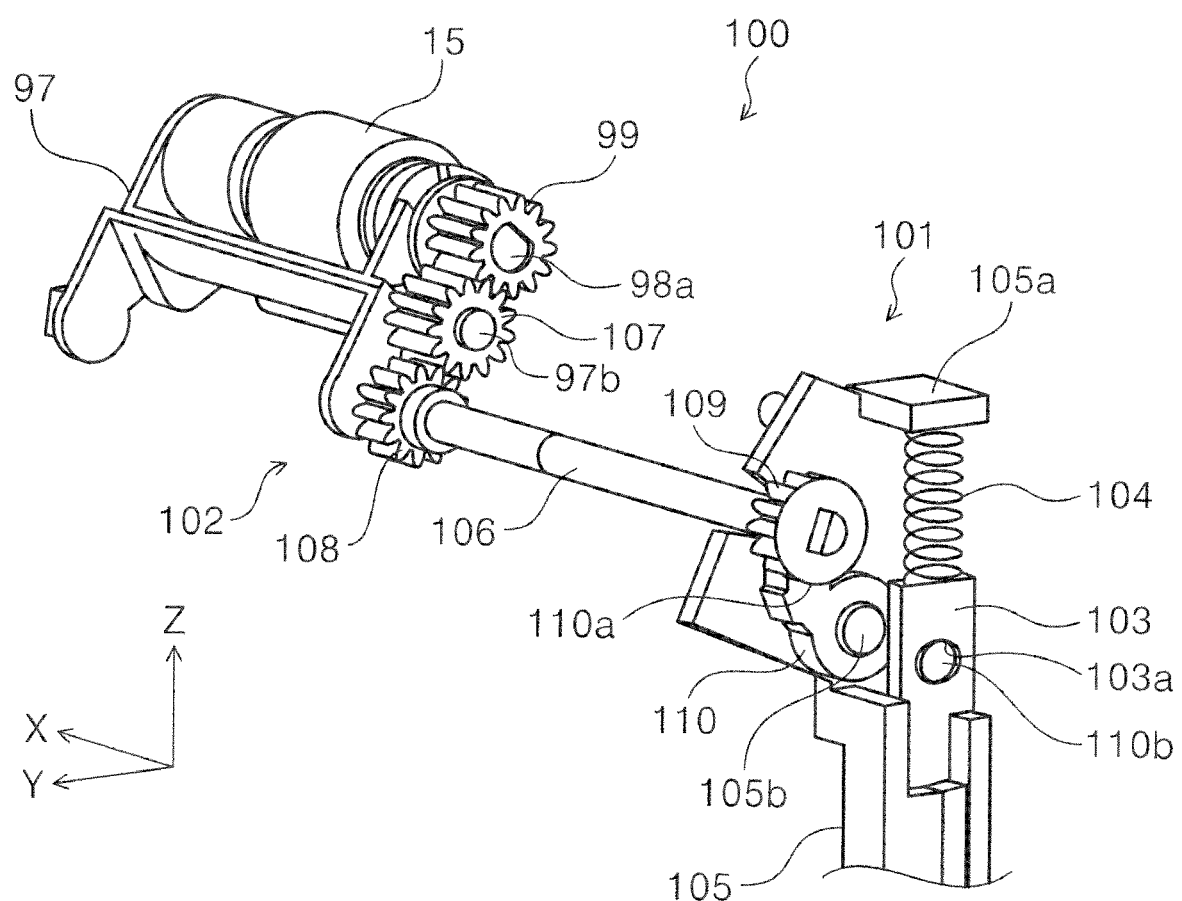
FIG. 17 is a perspective view of the separation switching section (the first embodiment) in a separation state.

As illustrated in FIG. 17, the separation switching section 100 includes a connection shaft 106. The connection shaft 106 is a shaft in which the shaft center line is parallel to the X axis direction and is rotatably provided with respect to a bearing portion (not illustrated) formed in the first frame 63. A third toothed wheel 108 is fixedly provided at an end portion of the connection shaft 106 in the X direction. That is, the third toothed wheel 108 and the connection shaft 106 do not rotate relatively.

The second toothed wheel 107 and the third toothed wheel 108 configure a second mechanism portion 102.

A fourth toothed wheel 109 is fixedly provided at the end portion of the connection shaft 106 in the −X direction. That is, the fourth toothed wheel 109 and the connection shaft 106 do not rotate relatively.

A rotation regulating member 110 is provided at the lower side of the fourth toothed wheel 109. The rotation regulating member 110 is rotatably provided with respect to the shaft portion 105b formed in a guide member 105.

The guide member 105 is a member fixed to the first frame 63 by a fixing section (not illustrated).

Figure 19:
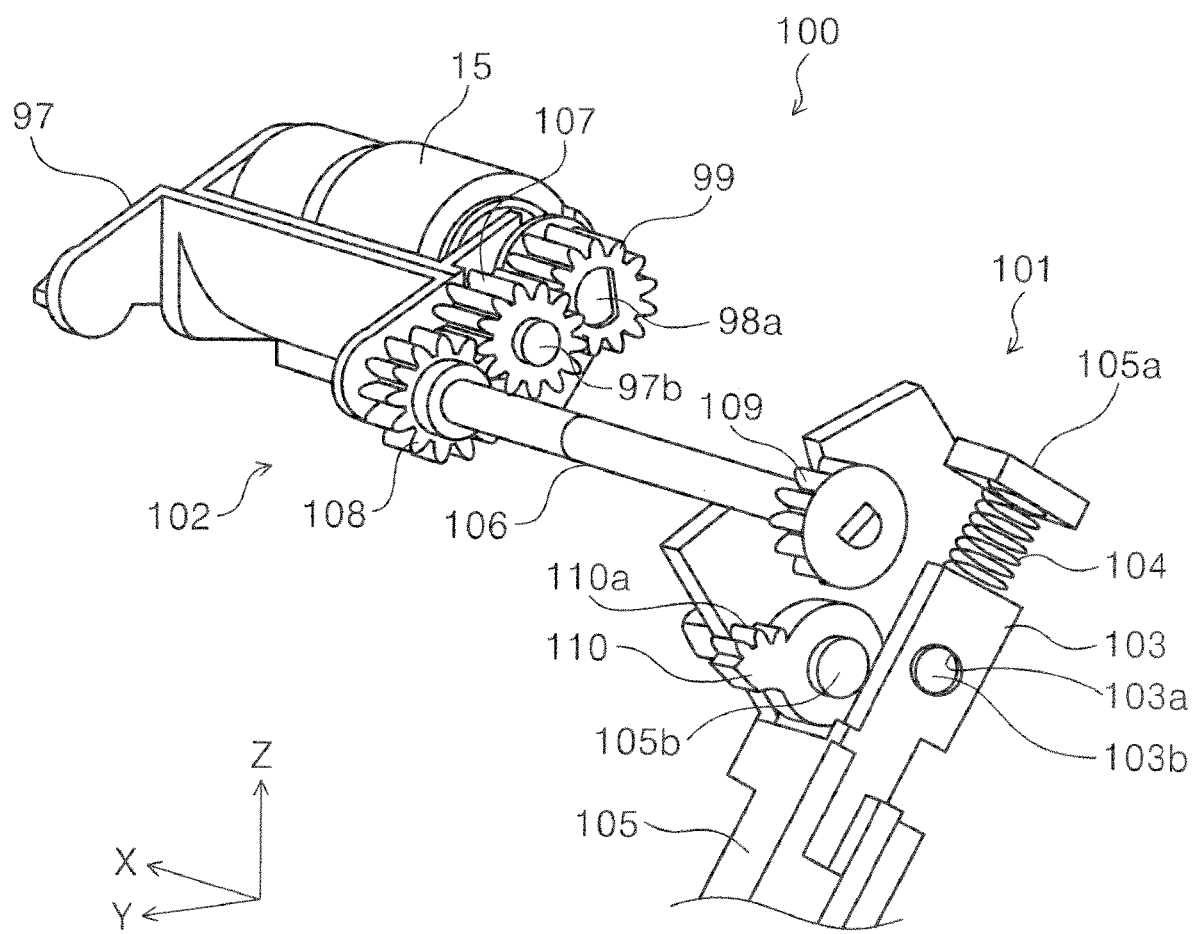
FIG. 19 is a perspective view of the separation switching section (the first embodiment) in a non-separation state.
Figure 20:
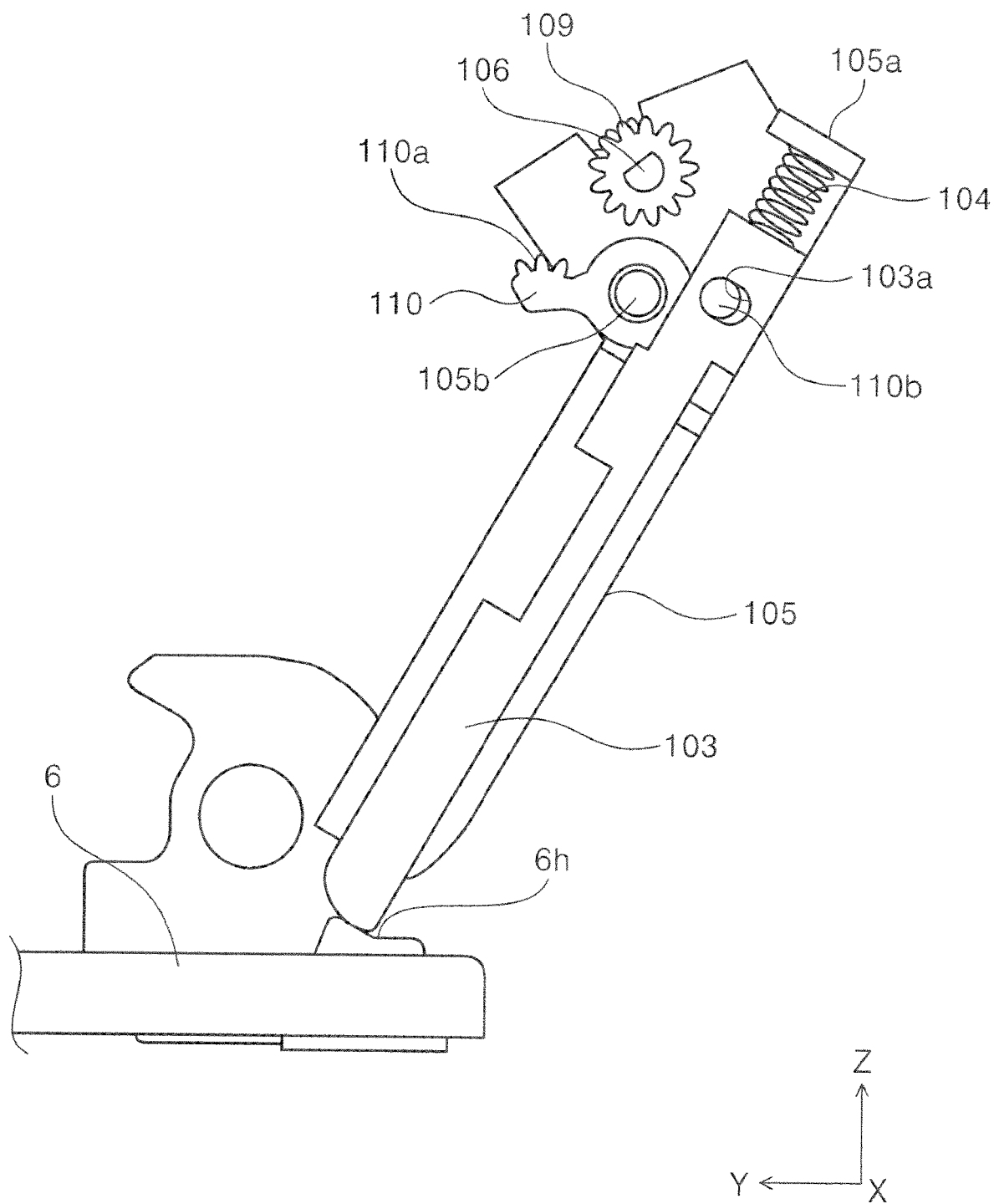
FIG. 20 is a side view of the separation switching section (the first embodiment) in the non-separation state.

A toothed portion 110a is formed in the rotation regulating member 110. The toothed portion 110a switches between a state of meshing with the fourth toothed wheel 109 (FIGS. 17 and 18) and a state of being separated from the fourth toothed wheel 109 (FIGS. 19 and 20) by the rotation of the rotation regulating member 110.

The rotation regulating member 110 is formed with a boss 110b protruding in the −X direction. The boss 110b is loosely inserted into a hole 103a that is formed in a link member 103.

The link member 103 is a member having a rod shape provided with respect to the guide member 105 in a slidable manner, and the lower end portion is in contact with a cam portion 6h that is formed at the main body supporting portion 6. The link member 103 is pressed toward the cam portion 6h by a compression coil spring 104, which is an example of the pressing member. The reference numeral 105a is a spring holding portion formed in the guide member 105.

Since the link member 103 performs a sliding operation with respect to the guide member 105, the rotation regulating member 110 rotates due to the sliding operation of the link member 103. In other words, the linear operation of the link member 103 is converted into a rotational operation of the rotation regulating member 110.

The fourth toothed wheel 109, the rotation regulating member 110, the guide member 105, the link member 103, the compression coil spring 104, and the cam portion 6h configure a first mechanism portion 101.

Figure 18:
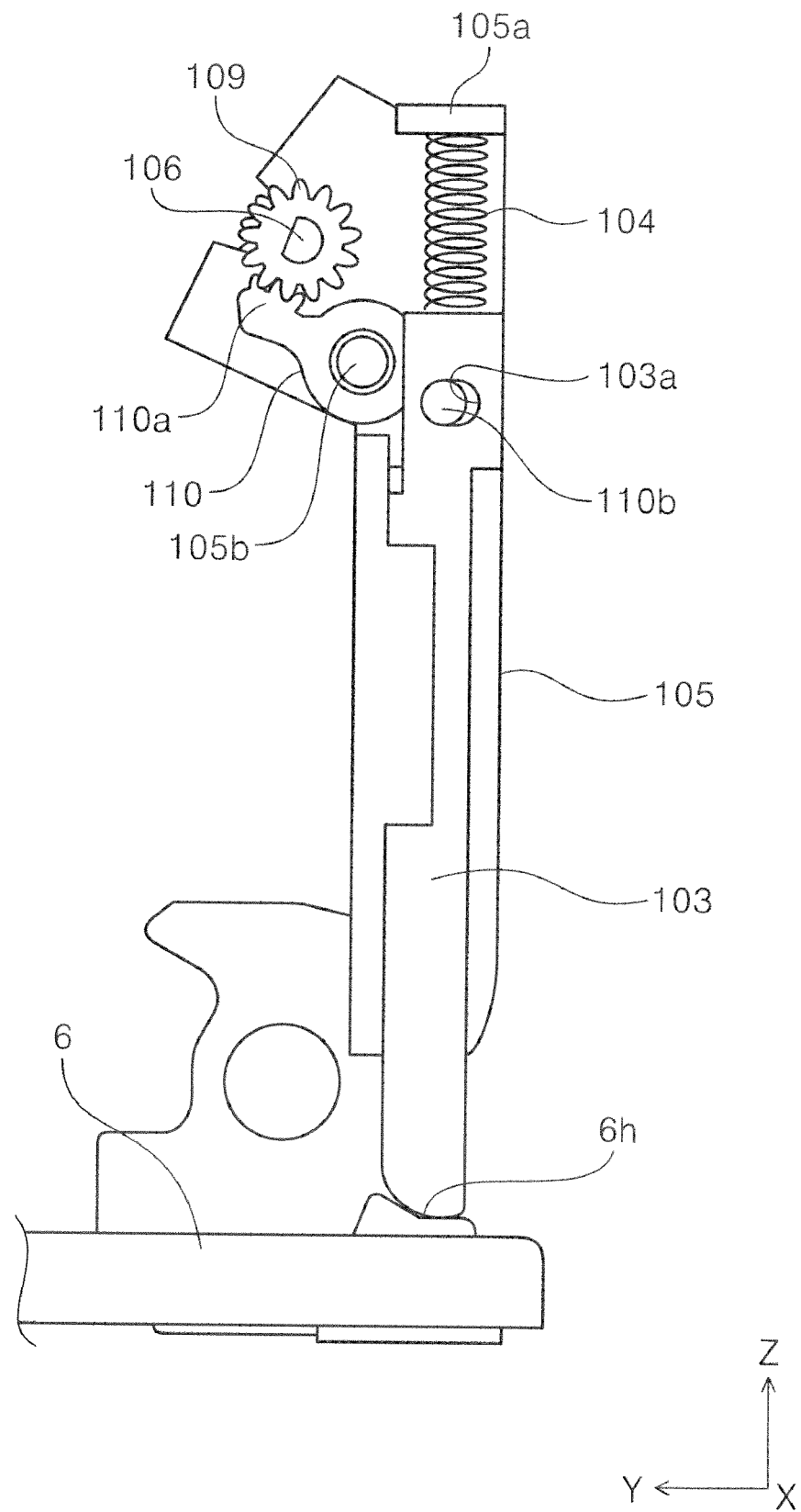
FIG. 18 is a side view of the separation switching section (the first embodiment) in the separation state.

When the apparatus main body 2 is in the normal reading posture, the toothed portion 110a of the rotation regulating member 110 meshes with the fourth toothed wheel 109 as illustrated in FIGS. 17 and 18. As a result, the rotation of the fourth toothed wheel 109 is regulated, the rotation of the connection shaft 106, the third toothed wheel 108, the second toothed wheel 107, and the first toothed wheel 99 is regulated, and the rotation of the torque limiter 98 is regulated. That is, the separation roller 15 becomes in the separation state.

When the apparatus main body 2 performs the posture switching toward the booklet reading posture from the above state, the lower end portion of the link member 103 switches a position in contact with the cam portion 6h. The cam portion 6h is formed such that the +Y direction is higher than the −Y direction, and when the apparatus main body 2 performs the posture switching toward the booklet reading posture, the lower end portion of the link member 103 moves in the +Y direction with respect to the cam portion 6h (see FIG. 20). As a result, the link member 103 slides in the upward direction, the rotation regulating member 110 rotates, and the toothed portion 110a is separated from the fourth toothed wheel 109. As a result, the rotation of the fourth toothed wheel 109 is allowed, the rotation of the connection shaft 106, the third toothed wheel 108, the second toothed wheel 107, and the first toothed wheel 99 is allowed, and the rotation of the torque limiter 98 is allowed. That is, the separation roller 15 becomes in the non-separation state.

When the apparatus main body 2 is in the booklet reading posture and when the apparatus main body 2 switches the posture to the normal reading posture from a state in which the separation roller 15 is in the non-separation state (FIGS. 19 and 20), the lower end portion of the link member 103 moves in the −Y direction with respect to the cam portion 6h. As a result, the link member 103 slides in the downward direction, the rotation regulating member 110 rotates, and the toothed portion 110a meshes with the fourth toothed wheel 109. As a result, the rotation of the fourth toothed wheel 109 is regulated, the rotation of the connection shaft 106, the third toothed wheel 108, the second toothed wheel 107, and the first toothed wheel 99 is regulated, and the rotation of the torque limiter 98 is regulated. That is, the separation roller 15 becomes in the separation state.

As described above, the apparatus main body 2 of the scanner 1 is rotatably attached to the main body supporting portion 6 and is capable of being switched between the normal reading posture and the booklet reading posture in which an angle formed by the read transporting path R2 and the placement surface G is smaller than that of the normal reading posture, by the rotation of the apparatus main body 2. Further, the separation switching section 100, which is capable of switching the state between the separation state in which the separation roller 15 separates the documents and the non-separation state in which the separation roller 15 does not separate the documents, is included. The separation switching section 100 puts the separation roller 15 in the separation state when the apparatus main body 2 is in the normal reading posture and puts the separation roller 15 in the non-separation state when the apparatus main body 2 is in the booklet reading posture.

As a result, the user does not need to perform a dedicated operation for switching between the separation state and the non-separation state of the separation roller 15, and the usability of the apparatus is improved.

Further, the scanner 1 is provided with the torque limiter 98 that applies the rotational resistance to the separation roller 15, and the separation switching section 100 regulates the rotation of the torque limiter 98 and regulates the associative rotation of the separation roller 15 and the torque limiter 98 to form the separation state. Further, the separation switching section 100 allows the rotation of the torque limiter 98 and allows the associative rotation of the separation roller 15 and the torque limiter 98 to form the non-separation state. As a result, the separation state and the non-separation state of the separation roller 15 can be easily switched.

The separation switching section 100 includes the link member 103 that is a member engaged with the cam portion 6*h* formed at the main body supporting portion 6 and is capable of sliding in the apparatus main body 2, and the compression coil spring 104 that presses the link member 103 toward the cam portion 6*h*. The cam portion 6*h* has a shape in which the link member 103 slides according to the rotation of the apparatus main body 2. By the link member 103 slides according to the rotation of the apparatus main body 2, the switching is performed between the separation state that is a state in which the rotation of the torque limiter 98 is regulated and the non-separation state that is a state in which the rotation of the torque limiter 98 is allowed.

Thereby, the separation switching section 100 can be implemented with a simple configuration.

The torque limiter 98 is provided with the first toothed wheel 99, and the separation switching section 100 is provided with the first mechanism portion 101 that includes the link member 103, the second mechanism portion 102 that is related to the first toothed wheel 99, and the connection shaft 106 that is a shaft configured to rotate extending along a rotation shaft line direction of the torque limiter 98 and that connects the first mechanism portion 101 and the second mechanism portion 102. Since the first mechanism portion 101 and the second mechanism portion 102 are connected by the connection shaft 106 in this way, the first mechanism portion 101 and the second mechanism portion 102 can be disposed separated from each other, and the degree of freedom in designing the apparatus is improved.

The second mechanism portion 102 is provided with the second toothed wheel 107 that meshes with the first toothed wheel 99 and a third toothed wheel 108 that is a toothed wheel meshing with the second toothed wheel 107 and that is provided at one end of the connection shaft 106. The first mechanism portion 101 includes the fourth toothed wheel 109 that is provided at the other end of the connection shaft 106 and the rotation regulating member 110 that is a member having the toothed portion 110*a* capable of meshing with the fourth toothed wheel 109 and in which the toothed portion 110*a* advances and retreats with respect to the fourth toothed wheel 109 when the rotation regulating member 110 is engaged with the link member 103 and rotates according to the slide of the link member 103.

When the toothed portion 110*a* meshes with the fourth toothed wheel 109, the rotation of the torque limiter 98 is regulated and the separation state is formed, and when the toothed portion 110*a* is separated from the fourth toothed wheel 109, the rotation of the torque limiter 98 is allowed and the non-separation state is formed.

The first frame 63 configuring the substrate of the apparatus main body 2 has a shape along a direction in which the read transporting path R2 extends, and the separation switching section 100 is disposed in an area formed at the lower side of the first frame 63. As a result, it is possible to suppress the increase in size of the apparatus by disposing the separation switching section 100 using the area formed at the lower side of the first frame 63.

The separation switching section 100 described above can also be modified as follows. Hereinafter, the separation switching section 100A according to a second embodiment will be described with reference to FIGS. 21 to 24. The same configurations as those already described in FIGS. 21 to 24 are designated with the same reference numerals, and duplicate description will be avoided below.

The separation switching section 100A has a first mechanism portion 101A and a second mechanism portion 102A, and the first mechanism portion 101A and the second mechanism portion 102A are connected by the connection shaft 106.

The second mechanism portion 102A includes a rotation regulating member 113 and a rotation cam 112. The first mechanism portion 101A includes a first rotation member 115, a second rotation member 116, a guide member 105, a link member 103, a compression coil spring 104, and a cam portion 6*h*.

Figure 21:
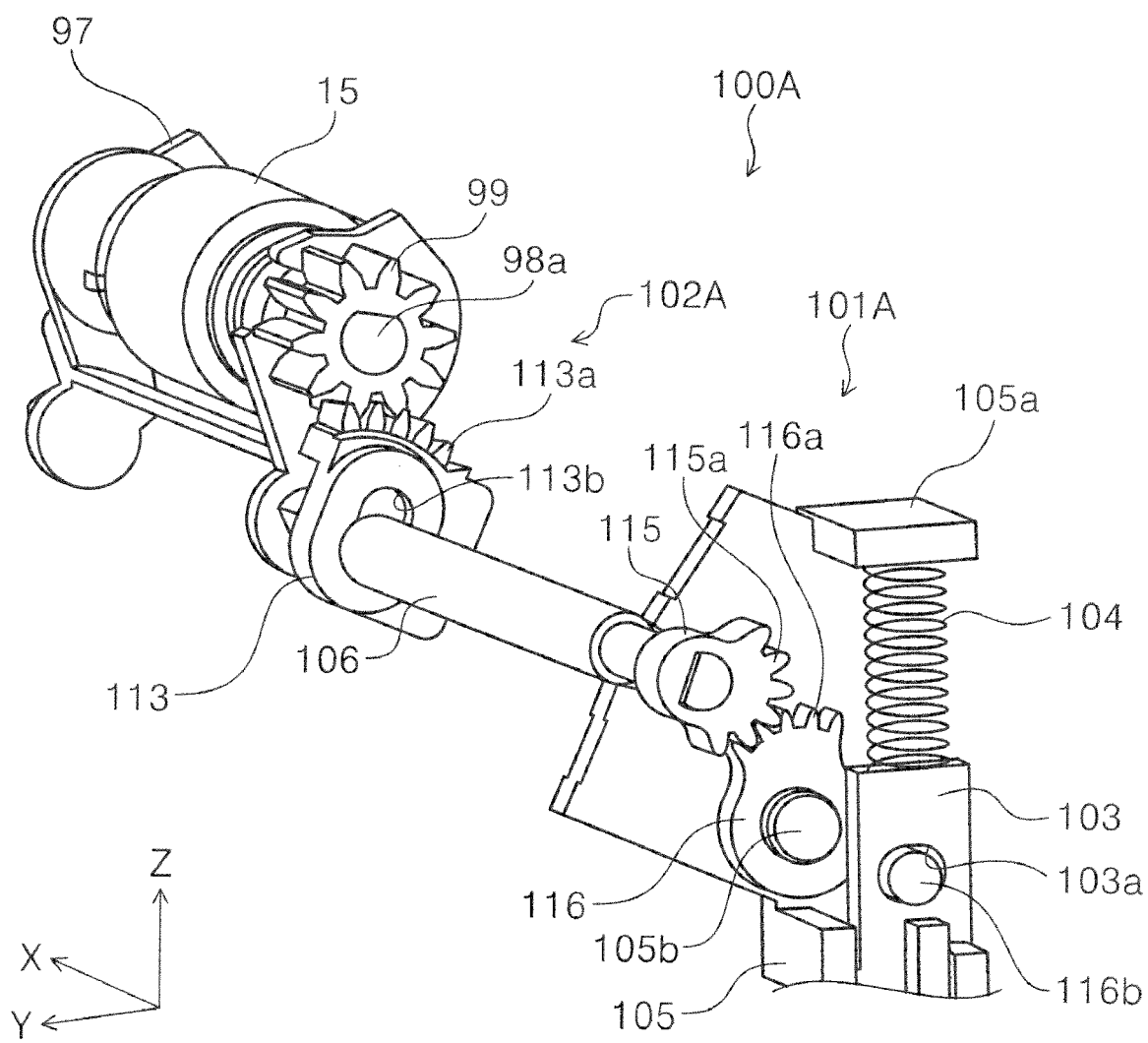
FIG. 21 is a perspective view of a separation switching section (a second embodiment) in a separation state.
Figure 22:
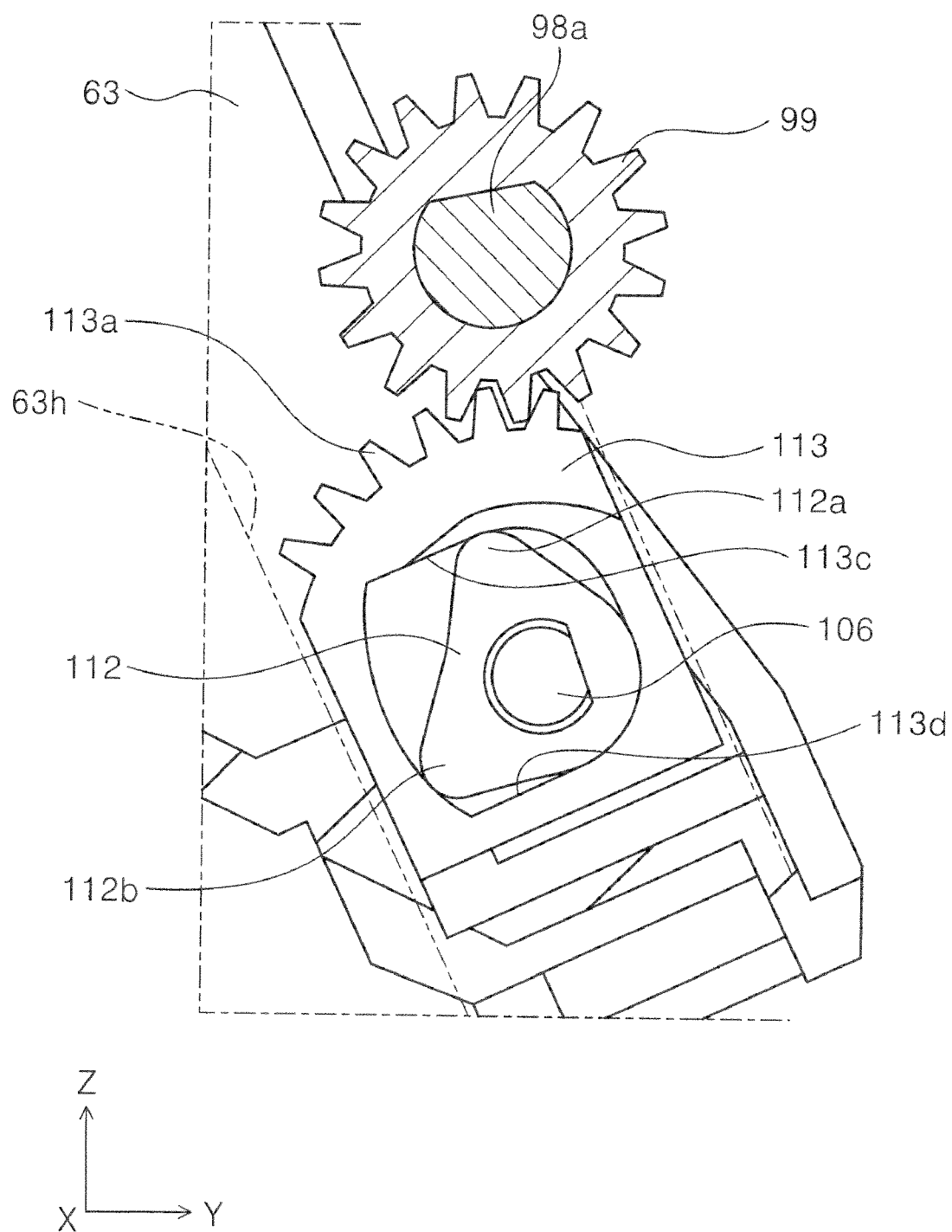
FIG. 22 is a side view of a main portion of the separation switching section (the second embodiment) in the separation state.

As illustrated in FIGS. 21 and 22, the rotation regulating member 113 is provided at the lower side of the first toothed wheel 99. The rotation regulating member 113 is provided along the guide groove 63*h* formed in the first frame 63 in a displaceable manner and advances and retreats with respect to the first toothed wheel 99 by being displaced along the guide groove 63*h*.

A toothed portion 113*a* is formed in the rotation regulating member 113, and by the displacement of the rotation regulating member 113, the switching is possible between a state in which the toothed portion 113*a* meshes with the first toothed wheel 99 and a state in which the toothed portion 113*a* is separated from the first toothed wheel 99.

When the toothed portion 113*a* meshes with the first toothed wheel 99, the rotation of the first toothed wheel 99 is regulated, so that the separation roller 15 becomes in the separation state. Further, when the toothed portion 113*a* is separated from the first toothed wheel 99, the rotation of the first toothed wheel 99 is allowed, so that the separation roller 15 becomes in the non-separation state.

The rotation regulating member 113 is formed with an elongated hole 113*b* along the displacement direction of the rotation regulating member 113, and the connection shaft 106 is passed through the elongated hole 113*b*. As illustrated in FIG. 22, a first cam follower 113c and a second cam follower 113d are formed at a surface of the rotation regulating member 113 in the +X direction, and a rotation cam 112 faces the cam followers.

The rotation cam 112 is fixed to one end of the connection shaft 106. That is, the rotation cam 112 and the connection shaft 106 do not rotate relatively. The rotation cam 112 has a first cam portion 112a and a second cam portion 112b protruding in the radial direction.

A first rotation member 115 is fixedly provided at an end portion of the connection shaft 106 in the −X direction. That is, the first rotation member 115 and the connection shaft 106 do not rotate relatively. The second rotation member 116 is rotatably provided on the shaft portion 105b of the guide member 105. A boss 116b is formed in the second rotation member 116, and the boss 116b is loosely inserted into a hole 103a formed in the link member 103. Therefore, the sliding operation of the link member 103 causes the second rotation member 116 to rotate.

A toothed portion 116a is formed in the second rotation member 116, and the toothed portion 116a meshes with a toothed portion 115a formed in the first rotation member 115.

With such a configuration, when the second rotation member 116 is rotated by the slide of the link member 103, the first rotation member 115, the connection shaft 106, and the rotation cam 112 are rotated.

When the apparatus main body 2 is in the normal reading posture, the toothed portion 113a of the rotation regulating member 113 meshes with the first toothed wheel 99 as illustrated in FIGS. 21 and 22. This state is maintained by the first cam portion 112a of the rotation cam 112 pushing up the first cam follower 113c of the rotation regulating member 113.

As a result, the rotation of the torque limiter 98 is regulated, and the separation roller 15 becomes in the separation state.

When the apparatus main body 2 performs the posture switching toward the booklet reading posture from the above state, the link member 103 is pushed up by the cam portion 6h as in the first embodiment described above. As a result, the second rotation member 116, the first rotation member 115, the connection shaft 106, and the rotation cam 112 rotate from the state illustrated in FIGS. 21 and 22 to the state illustrated in FIGS. 23 and 24. The rotational direction of the rotation cam 112 at this time is a counterclockwise direction in FIG. 22.

Figure 23:
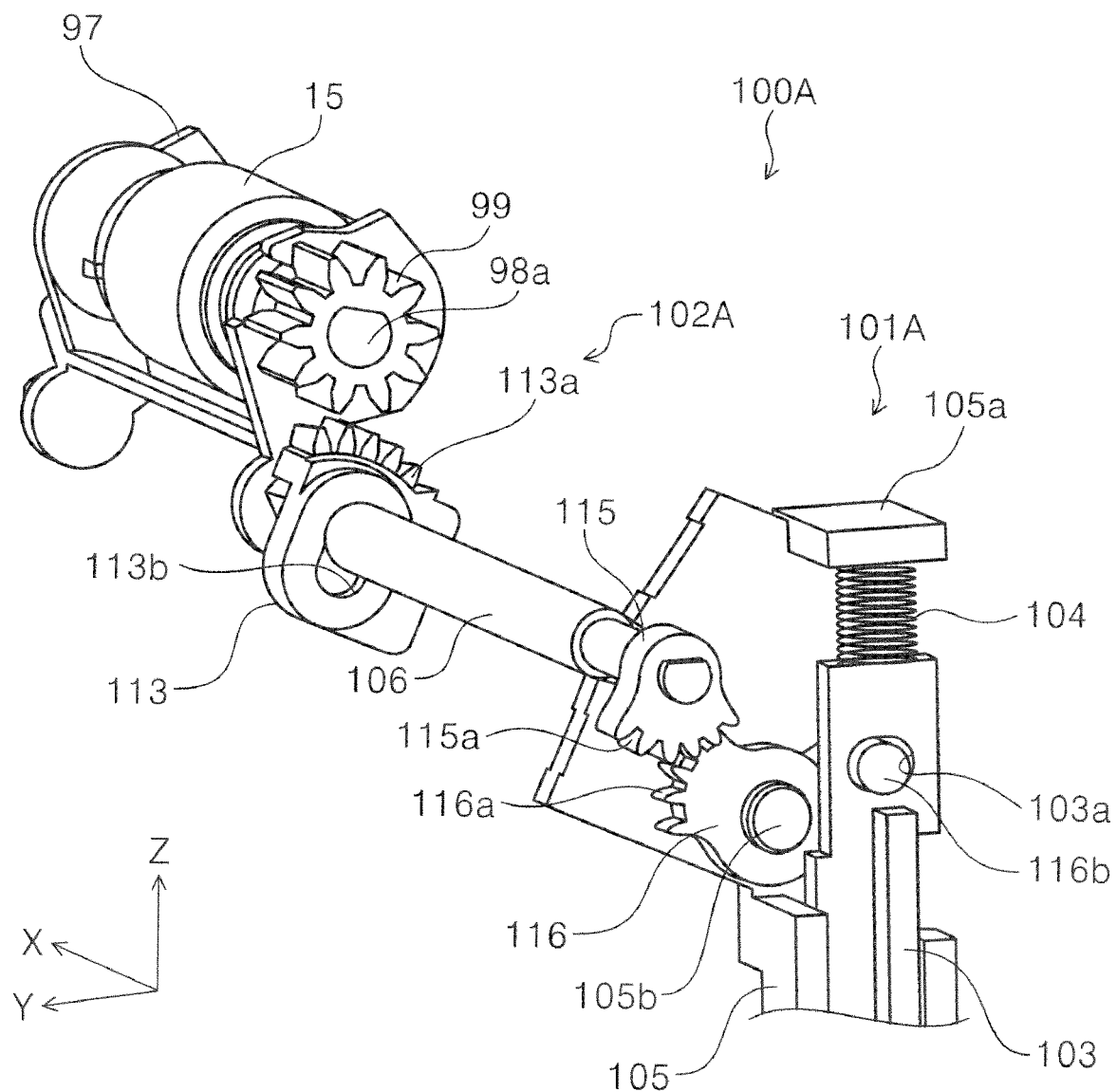
FIG. 23 is a perspective view of the separation switching section (the second embodiment) in a non-separation state.
Figure 24:
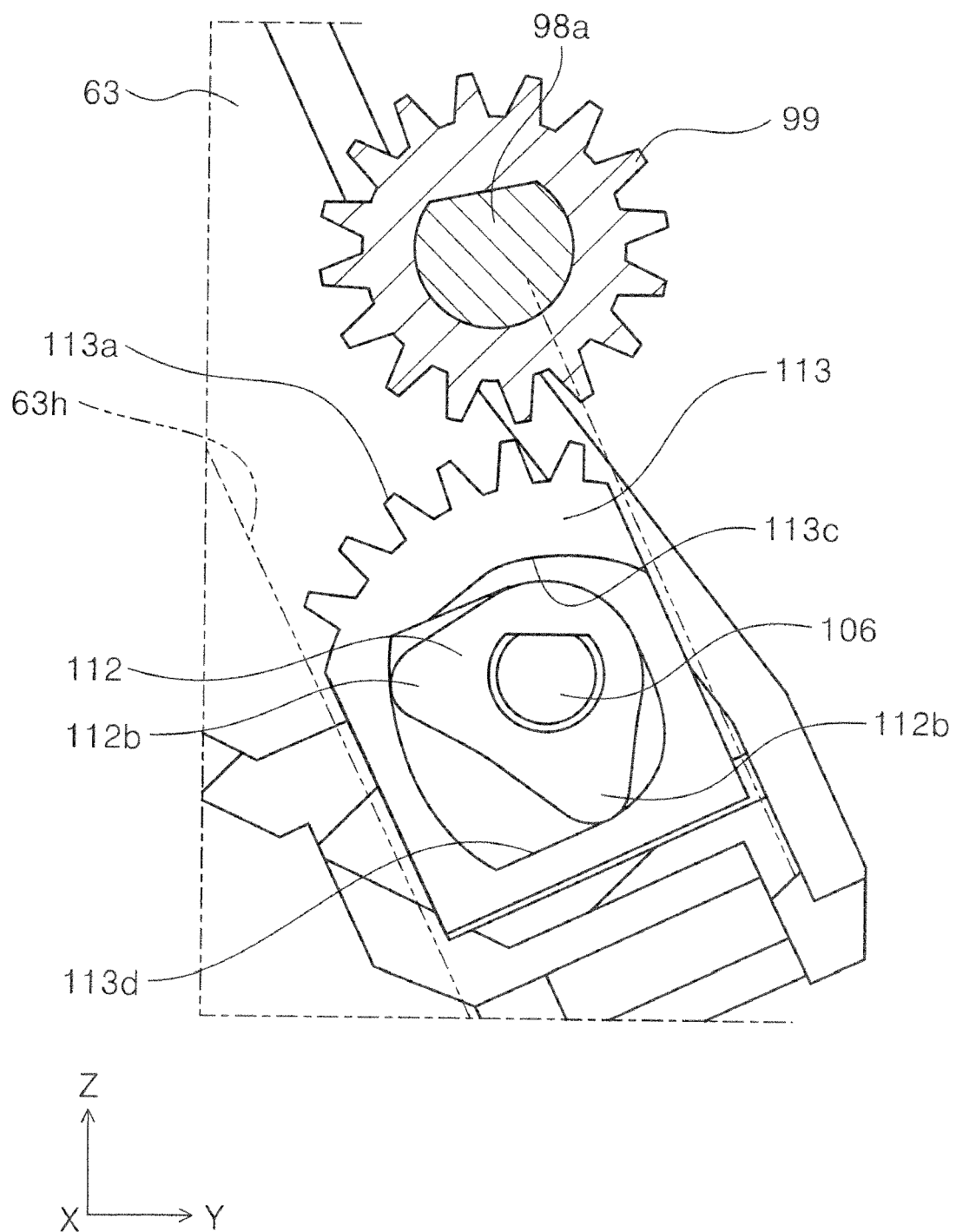
FIG. 24 is a side view of the main portion of the separation switching section (the second embodiment) in the non-separation state.

When the rotation cam 112 rotates counterclockwise from the state of FIG. 22, the second cam portion 112b pushes down the second cam follower 113d as illustrated with the change from FIG. 22 to FIG. 24. As a result, the rotation regulating member 113 is separated from the first toothed wheel 99, that is, the meshing between the toothed portion 113a and the first toothed wheel 99 is released, and the rotation of the torque limiter 98 is allowed. That is, the separation roller 15 becomes in the non-separation state.

When the apparatus main body 2 switches the posture to the normal reading posture from the state in which the apparatus main body 2 is in the booklet reading posture and the separation roller 15 is in the non-separation state, the link member 103 slides in the downward direction, the rotation cam 112 rotates clockwise from the state illustrated in FIG. 24, the first cam portion 112a pushes up the rotation regulating member 113, and the toothed portion 113a meshes with the first toothed wheel 99. As a result, the rotation of the torque limiter 98 is regulated, and the separation roller 15 becomes in the separation state.

As described above, in the second embodiment, the second mechanism portion 102A includes the rotation regulating member 113 that is a member having the toothed portion 113a meshing with the first toothed wheel 99 and is capable of advancing and retreating with respect to the first toothed wheel 99, and the rotation cam 112 that is a rotation cam provided at one end of the connection shaft 106 and that switches between a state in which the rotation regulating member 113 is caused to advance toward the first toothed wheel 99 and a state in which the rotation regulating member 113 is caused to retreat from the first toothed wheel 99 by the rotation of the rotation cam 112. The first mechanism portion 101A has a configuration in which the connection shaft 106 is rotated when the first mechanism portion 101A rotates according to the slide of the link member 103.

In the first embodiment, since the rotation of the first toothed wheel 99 is directly regulated by the rotation regulating member 113, the backlash in meshing of toothed wheels can be suppressed and twisting of the connection shaft 106 does not intervene, so the separation state of the separation roller 15 can be appropriately formed.

The present disclosure is not limited to the embodiments described above, and various modifications can be made within the scope of the disclosure described in the claims, and needless to say, the various modifications are also included in the scope of the present disclosure.

For example, when a displayer that is provided in the external apparatus 500 (see FIG. 12) is included, or when the scanner 1 includes a displayer, the displayer may display whether the separation roller 15 is in the separation state or the non-separation state. At that time, the displayer may also display whether the apparatus main body 2 is in the normal reading posture or the booklet reading posture.

Further, although the above-described embodiments have been described as an example applied to an image reading apparatus represented by a scanner, embodiments can also be applied to a recording apparatus represented by a printer. That is, by using the document in the above embodiments as a recording target medium and using the reading portion as a recording portion that performs recording on the recording target medium, the same effect as those in the above-described embodiments can be obtained in the recording apparatus. An ink jet printer is an example of the recording apparatus, and an ink jet type recording head is an example of the recording portion.

What is claimed is:
1. An image reading apparatus comprising:
a main body supporting portion placed on a placement surface of an apparatus;
an apparatus main body supported by the main body supporting portion;
a feeding roller feeding a document;
a separation roller provided at a position facing the feeding roller;
a reading portion reading the document that is fed by the feeding roller; and
a read transporting path that is a document transporting path for transporting the document and that faces the reading portion, wherein
the apparatus main body is rotatably attached to the main body supporting portion and is configured to be switched between a first posture and a second posture in which an angle formed by the read transporting path with the placement surface is smaller than that of the first posture by rotation of the apparatus main body, the image reading apparatus further comprises
a separation switching section configured to switch between a separation state in which the separation roller separates the document and a non-separation state in which the separation roller does not separate the document, and
the separation switching section puts the separation roller in the separation state when the apparatus main body is in the first posture and puts the separation roller in the non-separation state when the apparatus main body is in the second posture.

2. The image reading apparatus according to claim 1, further comprising:
a resistance applying portion applying rotational resistance to the separation roller, wherein
the separation switching section regulates rotation of the resistance applying portion and regulates associative rotation of the separation roller and the resistance applying portion to form the separation state, and
the separation switching section allows the rotation of the resistance applying portion and allows the associative rotation of the separation roller and the resistance applying portion to form the non-separation state.

3. The image reading apparatus according to claim 2, wherein
the separation switching section includes
a link member that is a member engaged with a cam portion formed at the main body supporting portion and is configured to slide in the apparatus main body, and
a pressing member that presses the link member toward the cam portion,
the cam portion has a shape in which the link member slides according to the rotation of the apparatus main body, and
when the link member slides according to the rotation of the apparatus main body, the separation state in which the rotation of the resistance applying portion is regulated and the non-separation state in which the rotation of the resistance applying portion is allowed, are switched.

4. The image reading apparatus according to claim 3, wherein
a first toothed wheel is provided in the resistance applying portion, and
the separation switching section includes
a first mechanism portion that has the link member,
a second mechanism portion that is related to the first toothed wheel, and
a connection shaft that is a shaft configured to rotate extending along a rotation shaft line direction of the resistance applying portion and that connects the first mechanism portion and the second mechanism portion.

5. The image reading apparatus according to claim 4, wherein
the second mechanism portion includes
a second toothed wheel that meshes with the first toothed wheel, and
a third toothed wheel that is a toothed wheel meshing with the second toothed wheel and is provided at one end of the connection shaft,
the first mechanism portion includes
a fourth toothed wheel that is provided at the other end of the connection shaft, and
a rotation regulating member that is a member having a toothed portion configured to mesh with the fourth toothed wheel and in which the toothed portion advances and retreats with respect to the fourth toothed wheel when the rotation regulating member is engaged with the link member and rotates according to the slide of the link member, and
when the toothed portion meshes with the fourth toothed wheel, the rotation of the resistance applying portion is regulated and the separation state is formed, and when the toothed portion is separated from the fourth toothed wheel, the rotation of the resistance applying portion is allowed and the non-separation state is formed.

6. The image reading apparatus according to claim 4, wherein
the second mechanism portion includes
a rotation regulating member that is a member having a toothed portion meshing with the first toothed wheel and is configured to advance and retreat with respect to the first toothed wheel, and
a rotation cam that is a rotation cam provided at one end of the connection shaft and that switches between a state in which the rotation regulating member is caused to advance toward the first toothed wheel and a state in which the rotation regulating member is caused to retreat from the first toothed wheel by rotation of the rotation cam, and
the first mechanism portion has a configuration in which the connection shaft is rotated when the first mechanism portion rotates according to the slide of the link member.

7. The image reading apparatus according to claim 1, further comprising
a frame configuring a substrate of the apparatus main body, wherein
the frame has a shape along a direction in which the read transporting path extends, and
the separation switching section is disposed in an area formed at a lower side of the frame.

8. The image reading apparatus according to claim 1, further comprising:
an inversion transporting path that is a document transporting path downstream from the read transporting path and is used when the read document is inverted upward and ejected;
a non-inversion transporting path that is a document transporting path downstream from the read transporting path and is used when the read document is ejected without being inverted; and
a transporting path switching section that switches a document transporting path coupled to the read transporting path to either the inversion transporting path or the non-inversion transporting path, wherein
the transporting path switching section couples the read transporting path to the inversion transporting path when the apparatus main body takes the first posture and couples the read transporting path to the non-inversion transporting path when the apparatus main body takes the second posture.

9. The image reading apparatus according to claim 1, further comprising
a handle portion, wherein
a posture of the apparatus main body is switched by an external force from the handle portion.

10. The image reading apparatus according to claim 1, further comprising
   a posture switching motor, wherein
   a posture of the apparatus main body is switched by power of the posture switching motor.

\* \* \* \* \*